(12) United States Patent
Foot et al.

(10) Patent No.: US 8,170,801 B2
(45) Date of Patent: May 1, 2012

(54) DETERMINING FLUID RATE AND PHASE INFORMATION FOR A HYDROCARBON WELL USING PREDICTIVE MODELS

(75) Inventors: John Foot, Methlick (GB); Richard Heddle, Camberley (GB); Michael J. Webster, Bieldside (GB)

(73) Assignee: BP Exploration Operating Company Limited, Sunbury-on-Thames (GB)

( * ) Notice: Subject to any disclaimer, the term of this patent is extended or adjusted under 35 U.S.C. 154(b) by 405 days.

(21) Appl. No.: 12/035,209

(22) Filed: Feb. 21, 2008

(65) Prior Publication Data

US 2008/0234939 A1 Sep. 25, 2008

Related U.S. Application Data

(60) Provisional application No. 60/891,617, filed on Feb. 26, 2007.

(51) Int. Cl.
*G01N 15/08* (2006.01)
*G01F 23/00* (2006.01)

(52) U.S. Cl. ............ 702/12; 702/50; 702/182; 702/189
(58) Field of Classification Search ............ 702/12, 702/50–64, 182–190
See application file for complete search history.

(56) References Cited

U.S. PATENT DOCUMENTS

| | | | |
|---|---|---|---|
| 6,789,937 B2 | 9/2004 | Haddad et al. | |
| 6,941,254 B2 | 9/2005 | Duret et al. | |
| 2004/0040746 A1 | 3/2004 | Niedermayr et al. | |
| 2004/0084180 A1 * | 5/2004 | Shah et al. | 166/250.16 |
| 2005/0149307 A1 | 7/2005 | Gurpinar et al. | |
| 2005/0268702 A1 | 12/2005 | Johansen | |

FOREIGN PATENT DOCUMENTS

| | | | |
|---|---|---|---|
| WO | 00/33070 A1 | | 6/2000 |
| WO | WO 00/33070 | * | 6/2000 |
| WO | 2005/045371 A1 | | 5/2005 |
| WO | 2006/010959 A1 | | 2/2006 |
| WO | WO 2006/010959 | * | 2/2006 |

OTHER PUBLICATIONS

R. Cramer, Society of Petroleum Engineers-SPE 99971, Well Test Optimization and Automation.*
Perkins, Critical and Subcritical Flow of Multiphase Mixtures Through Chokes, Dec. 1993.*
Cramer et al., "Well-Test Optimization and Automation", SPE 99971, SPE Intelligent Energy Conference and Exhibition (Society of Petroleum Engineers Inc., 2006), pp. 1-7.*

(Continued)

*Primary Examiner* — Phuong Huynh
(74) *Attorney, Agent, or Firm* — Barbara A. Fisher

(57) ABSTRACT

Physical models of wells are used to determine rate and phase composition for fluid produced from or injected into the wells on a near real time and continuous basis. The method can be used to alert operators or others of conditions in a well or field to permit more immediate response. The method can be more tolerant of sensor faults, sensor drift, anomalous data or other occurrences which could otherwise lead to incorrect output. More than one model can be used to permit a hierarchy of calculation such that the rate and phase determination is more tolerant of anomalous data. The calculated rate and phase values from one or more wells can be reconciled against facility data.

3 Claims, 11 Drawing Sheets

OTHER PUBLICATIONS

Foot et al., "ISIS—A Real-Time Information Pipeline", SPE Paper 99850, 2006 SPE Intelligent Energy Conference and Exhibition (Apr. 11-13, 2006).

PCT International Search Report and Written Opinion dated Jul. 16, 2008 for International Application No. PCT/GB2008/000624.

Anonymous: ""Multi phase Flow Technology"—VMSS3 Technical Description" Ensys Yocum Technical Paper, [Online] Jan. 14, 2007, XP002481033, Retrieved from the Internet: URL:http://web.archive.org/web/20070114225835/http://www.ensysenergy.com/EYI+Files/VMSS3+Technical+Descript10n.pdf> [retrieved on May 21, 2008] the whole document.

Anonymous: "VMSS3 Technical Description" Wayback Machine Page, [Online] XP002481034, Retrieved from the Internet: URL: http://web.archive.org/web/*/http://www.ensynergy.com/EYI%20Files/VMSS3%20Technocal% 20Description.pdf> Page retrieved from the "Internet Archive WayBack Machine" to establish the publication date of the "Mulitphase Flow Technology" document. The publication dated of Jan. 14th, 2007 has been selected.

Honeywell, "Operations and Production Management FLEX" [Online] Retrieved from the Internet URL:http://hpsweb.honeywell.com/Cultures/en-US/Products/BusinessApplications/businessflex/defa, date unknown [retrieved on Sep. 16, 2010].

Honeywell, "Operations and Production Management" [Online] Retrieved from the Internet URL:http://hpsweb.honeywell.com/Cultures/en-US/Support/Notifications/OperationsAndProduction/, date unknown [retrieved on Sep. 16, 2010].

Honeywell, "Honeywell Production Control Center: Features" [Online] Retrieved from the Internet URL:http:// hpsweb.honeywell.com/Cultures/en-US/Products/OperationsApplications/Operations-Man, date unknown [retrieved on Sep. 16, 2010].

Millette, "Oil & Gas Operational Excellence", 8th Africa Oil & Gas Conference, 2004, pp. 1-38, Honeywell Process Solutions, United States.

Bieker et al., "Real-Time Production Optimization of Offshore Oil and Gas Production Systems: A Technology Survey", SPE 99446, SPE Intelligent Energy Conference and Exhibition (Society of Petroleum Engineers Inc., 2006) pp. 1-8.

Poulisse et al., "Continuous Well Production Flow Monitoring and Surveillance", SPE 99963, SPE Intelligent Energy Conference and Exhibition (Society of Petroleum Engineers Inc., 2006), pp. 1-6.

Sun et al., "Using Downhole Real-Time Data to Estimate Zonal Production in a Commingled-Multiple-Zones Intelligent System", SPE 102743, SPE Annual Technical Conference and Exhibition (Society of Petroleum Engineers Inc., 2006), pp. 1-9.

McCracken et al., "Rate Allocation Using Permanent Downhole Pressure", SPE 103222, SPE Annual Technical Conference and Exhibition (Society of Petroleum Engineers Inc., 2006), pp. 1-10.

Van Dijk et al., "Closing the Loop for Improved Oil and Gas Production Management", SPE 111997, SPE Intelligent Energy Conference and Exhibition (Society of Petroleum Engineers Inc., 2008), pp. 1-11.

T.K. Perkins, Arco E&P Technology, "Critical and Subcritical Flow of Multiphase Mixtures Through Chokes", SPE Drilling & Completion, Dec. 1993, pp. 271-276.

* cited by examiner

DETERMINING FLUID RATE AND PHASE INFORMATION FOR A HYDROCARBON WELL USING PREDICTIVE MODELS

CROSS-REFERENCE TO RELATED APPLICATIONS

This application claims priority, under 35 U.S.C. §119(e), of Provisional Application No. 60/891,617, filed Feb. 26, 2007, incorporated herein by this reference.

STATEMENT REGARDING FEDERALLY SPONSORED RESEARCH OR DEVELOPMENT

Not applicable.

BACKGROUND OF THE INVENTION

This invention is in the field of oil and gas production, and is more specifically directed to the real-time monitoring of fluid flow rates for multiple fluid phases from hydrocarbon wells.

Hydrocarbon production from subterranean reservoirs typically involves multiple wells positioned at various locations of a reservoir. In a given reservoir, the multiple wells are not only deployed at different surface locations, but are also often of different "geometry" from one another, and are also often drilled to different depths. Many typical wells also produce fluids at multiple depths along a single wellbore, thus producing from multiple subsurface strata. As is fundamental in the art, the fluid produced from a given well, as viewed at the wellhead, often includes multiple "phases", typically natural gas, petroleum or oil, and water. As used herein, the term "phase composition" or simply "phase" in reference to produced fluid refers to the relative amounts of water, oil and gases in the produced fluid. The produced fluid may also contain suspended solids such as sand or asphaltene compounds. In addition, as is well-known in the art, one or more wells into a reservoir may be configured for the injection of fluids, typically gas or water, for secondary recovery and other reservoir management functions.

Knowledge of the rate of production and phase composition of the produced fluids are important properties for effective reservoir management and also for management of individual wells. Reservoir management typically includes the selection of the number of wells to be deployed in a production field, the locations and depths of these wells, the configuration of wells as production or injection wells, and decisions regarding whether to shut-in wells, or convert wells from production to injection wells or vice versa. Well management refers to decisions regarding individual wells, for example decisions regarding whether to perform remedial actions along the wellbore to improve production. Knowledge of production rate and phase information is, of course, also important from an economic standpoint.

Rate and phase information is commonly determined using flow meters or other equipment. For example, separating equipment may be located at or near a wellhead to separate produced phases so that the volume of each phase can be determined. Valves downstream from the separators divert all or a portion of the production stream for a separated phase to a flow meter or the like for measurement of the flow rate of that particular phase. Typically, this diversion is performed only periodically for each phase, for example once per month for a span of twelve hours, because of the effort and flow interruption involved in re-directing the flow of the various phases. This lack of real-time flow measurements of course reduces confidence in the measurements obtained, and in the decisions made based on those measurements.

In addition to the cumbersome nature of these flow measurements, conventional flow meters generally require frequent calibration to ensure accuracy, considering the typical drift of conventional flow meters over time. Conventional flow meters are also typically calibrated to be accurate only within a certain operating range. If operating conditions change so that the steady-state condition of a well drifts outside the operating range, the flow measurements can be unreliable. In either case, calibration drift or change in operating conditions, the flow meter must be recalibrated, adjusted, or replaced, each action usually requiring physical intervention.

While recalibration and maintenance of flow meters is somewhat cumbersome for land-based wells, the recalibration and maintenance of flow meters is typically prohibitively difficult and costly in marine environments. In addition, the inability to service offshore flow meters can cause total loss of flow measurement if a critical sensor fails. Deep sea marine environments present particularly significant challenges for maintenance or otherwise routine operations. For example, flow meters located within a well or at a wellhead can be prohibitively difficult to recalibrate due to the difficult access for maintenance, as costly intervention vessels and other equipment are often required.

In addition, not all wells in a production field are equipped with a dedicated flow meter. Rather, many wells share access to flow meters with other wells in the field. This is especially true in off-shore production, because of the difficulty of maintaining sea-bed downhole sensors in the deep-sea environment. This sharing has been observed to add uncertainty in rate and phase measurements. Typically, in such a shared metering environment, especially offshore, production from several wells is commingled before reaching any platform or other topside facility. As used herein, "topside" in reference to equipment or facilities means equipment or facilities which are located either at or above ground for land-based wells, or at or above the water surface for sea environments (e.g., production platforms and shore-bound surface facilities). In either case, shared topside flow metering typically does not allow determination of production from individual wells without stopping production from other wells.

By way of further background, U.S. Patent Application Publication No. 2004/0084180 describes a method of estimating multi-phase flow rates at each of multiple production string entries located at varying depths along a wellbore, and thus from different production zones of a single well. According to the method of this publication, a volumetric flow rate for each phase is obtained at the wellhead, which of course includes production from each of the downhole production zones. The measured volumetric wellhead flow, along with downhole pressure and temperature measurements, are applied to a well model to iteratively solve for estimates of the flow rate of each phase at each downhole production string entry location.

By way of further background, software packages for modeling the hydraulics of hydrocarbon wells, as useful in the design and optimization of well performance, are known in the art. These conventional modeling packages include the PROSPER modeling program available from Petroleum Experts Ltd, the PIPESIM modeling program available from Schlumberger, and the WELLFLOW modeling program available from Halliburton. These software modeling packages utilize actual measured, or estimated, values of flow, pressure, and temperature parameters to characterize the modeled well and to estimate its overall performance. In addition, these modeling packages can assist in decision making, for example by evaluating the effect on well performance of proposed changes in its operation.

By way of still further background, U.S. Patent Application Publication No. US 2005/0149307 A1, published Jul. 7, 2005, describes the use of well models in reservoir management. Pressure measurements, multi-phase flow rates, etc. are applied to a well production model, and the model is verified based on various well and reservoir measurements and parameters.

The conventional uses of well modeling in well and reservoir management, especially involving the determination of rate and phase values, operate as "snapshots" in time. In other words, the various measurements acquired in the field are applied to the well model "off-line", with the well model operated by a human engineer or other operator to determine an estimate of the state of the well. In many instances, the measurements are obtained or inferred from well tests, such as shut-in tests, during which the well is shut-in suddenly, and the subsequent response of the measured pressure is recorded. Such well testing is, of course, infrequent in a producing field. And as is well-known in the art, substantial human effort and judgment required to select an appropriate well model for a particular set of measurements, to apply judgment and filtering to measurements that appear to be inaccurate, and to evaluate the well model results.

By way of further background, the deployment of downhole pressure and temperature sensors has become increasingly common in recent years, because of improvement in the reliability and long-term performance of such downhole sensors. These modern downhole sensors can now provide measurement data on a continuous and near real time basis, with measurement frequencies exceeding one-per-second.

BRIEF SUMMARY OF THE INVENTION

It is therefore an object of this invention to provide automated real-time rate and phase monitoring of hydrocarbon wells based on pressure and temperature measurements, and sometimes other measurements, at the well.

It is a further object of this invention to provide such monitoring without requiring the continuous use of flow meters or volumetric flow measurement equipment, deployed either downhole or at the wellhead.

It is a further object of this invention to provide such monitoring using a selected one of a plurality of available well models, with the model selected in an automated manner according to the current operating state of a given well.

It is a further object of this invention to provide automated detection of a current operating state of a well based on based on pressure and temperature measurements at the well, applied to one or more well models.

It is a further object of this invention to provide such monitoring in which rate and phase information is obtained despite the presence of sensor faults, sensor calibration drift, anomalous measurements, and the like.

It is a further object of this invention to provide such monitoring of rate and phase that can be readily reconciled with facility data for the production field, and with measurements from other wells in the field.

It is a further object of this invention to provide such monitoring to provide rate and phase information in an extremely efficient computational manner in response to minimal changes in the pressure and temperature measurements at a well.

Other objects and advantages of this invention will be apparent to those of ordinary skill in the art having reference to the following specification together with its drawings.

This invention provides a robust method for determining rate and phase information for one or more wells without reliance on continual flow-metering. The wells can be production wells, injection wells or any combination thereof. The method can be used in real time and continuously to provide such rate and phase information. This invention can also be used to alert operators or others of conditions in a well or field to permit more immediate response. This invention also provides methods which are more tolerant of sensor faults, sensor drift, anomalous data or other occurrences which could otherwise lead to incorrect output. This invention also provides a method of using more than one model to permit a hierarchy of calculation such that the rate and phase determination is more tolerant of anomalous data, indeed tolerant of a total failure of a sensor. This invention also provides a method for reconciling rate and phase information calculated from one or more wells with facility data.

This invention may be implemented into a method, computer system, or computer-readable medium storing a computer program, according to which temperature and pressure readings obtained from sensors at a well are applied to one or more predictive well models that calculate fluid rate and phase composition for that well, at a time associated with the temperature and pressure readings, on a near real time and continuous basis. Valve and choke data can also be obtained and used by the models. The invention may carry out this function by applying data corresponding to these temperature, pressure, and other measurements to one or more predictive models in which one or more other model parameters, conventionally expressed as constants or assumed values, are determined by evaluating a function. The use of a function to express the model parameter, for example as a function of time or cumulative production output, extends the longevity of the model and enables its use on a near-real-time and continuous basis.

In another embodiment, the invention provides a method of determining rate and phase of fluid produced from or injected into a well, calculating the difference between temperature and pressure readings over time, and applying this difference to one or more predictive models to determine a change in fluid rate and a change in phase composition. The predictive models can be predominantly one dimensional mathematical representations of the well based on physical and thermodynamic laws; determining pressure conditions in at least two positions along the well; determining temperature conditions in at least one position along the well; inputting the determined pressure conditions and temperature conditions into the predictive model; calculating, using the predictive model, fluid rate and phase composition.

The method, system, and computer program of this invention can be used in this manner to identify well sensor faults by identifying one or more anomalous readings by way of calculation inconsistencies between the readings and expected values for the readings based on the predictive well models and readings from other sensors, for example readings from at least one more sensor than required by the predictive model to calculate rate and phase of the fluid. The method, system, and computer program can be used in this manner to calibrate the readings from the sensor.

The method, system, and computer program of this invention can be used to reconcile the calculated rate and phase information over time from multiple wells in a production field with information from an export facility shared by those multiple wells, and for other management functions.

The method, system, and computer program provided by this invention can be applied to more than one well in a field. The methods can be applied to production wells and injection wells.

DETAILED DESCRIPTION OF THE INVENTION

The present invention will be described in connection with its preferred embodiment, namely as implemented into an existing production field from which oil and gas are being extracted from one or more reservoirs in the earth, because it is contemplated that this invention will be especially beneficial when used in such an environment. However, it is contemplated that this invention may also provide important benefits when applied to other tasks and applications. Accordingly, it is to be understood that the following description is provided by way of example only, and is not intended to limit the true scope of this invention as claimed.

As will be evident to those skilled in the art having reference to this specification, the preferred embodiments of this invention employ physical models, temperature sensors and pressure sensors, and where applicable, valves and choke positions, to determine the rate and phase of fluid produced from a well. This invention can also provide rate and phase data and information, and other useful information, on a continuous basis in real-time or near-real-time, to allow improved well or field operation. As used herein, the "real time" or "near real time" operation refers to the ability of this invention to provide such rate and phase data and information, and other such useful information, sufficiently timely so that the results, when provided, reflect a reasonably current state of the well. For example, it is contemplated that, according to the preferred embodiments of this invention, the rate and phase data and information is provided at least as frequently as every few hours, preferably ranging from about once every hour or two to as frequently as several times each hour, as frequently as about every five minutes, or even as frequently as once per minute. As used herein, the "continuous" operation of providing rate and phase data and information refers to the operation of embodiments of this invention so that, following the completion of one instance of the determination of rate and phase information for a given well or wells, a next instance of that process starts, without any significant or substantial delay. For example, it is contemplated that "continuous" refers to the operation of embodiments of this invention on a periodic basis, with one period effectively beginning upon the end of a previous period, such periods of lengths as mentioned above, ranging from as frequently as about once per minute (or more frequent yet) to on the order of about once every few hours.

Figure 1:
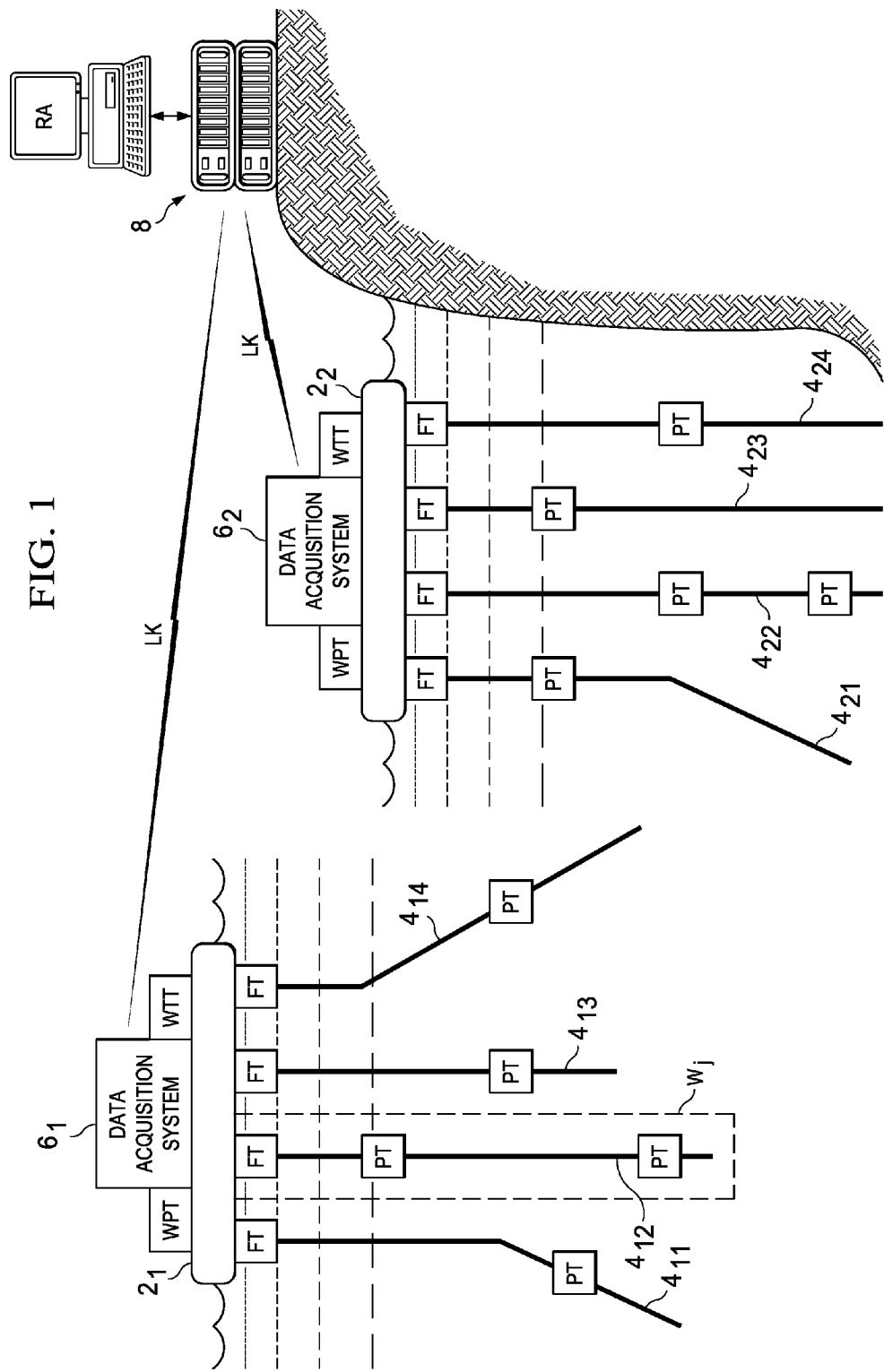
FIG. 1 is a schematic diagram illustrating the measurement and analysis system of a preferred embodiment of the invention as deployed in a oil and gas production field.

FIG. 1 illustrates an example of the implementation of the preferred embodiment of the invention, as realized in an offshore oil and gas production field. In this example, two offshore drilling and production platforms $2_1$, $2_2$ are shown as deployed; of course, typically more than two such platforms 2 may be used in a modern offshore production field. Each of platforms $2_1$, $2_2$ supports one or more wells W, shown by completion strings $4_{11}$ through $4_{14}$ supported by platform $2_1$, and completion strings $4_{21}$ through $4_{24}$ supported by platform $2_2$. Of course, more or fewer than four completion strings 4 may be supported by a single platform 2, as known in the art. A given completion string 4 and its associated equipment, including downhole pressure transducers PT, wellhead pressure transducers WPT, wellhead temperature transducers WTT, flow transducers FT, and the like, will be referred to in this description as a well W, an example of which is well $W_{12}$ indicated in FIG. 1.

According to this preferred embodiment of the invention, one or more downhole pressure transducers or sensors PT is deployed within each completion string 4. Downhole pressure transducers PT are contemplated to be of conventional design and construction, and suitable for downhole installation and use during production. Examples of modern downhole pressure transducers PT suitable for use in connection with this invention include those available from Quartzdyne Inc., among others available in the industry.

In addition, as shown in FIG. 1, conventional wellhead pressure transducers WPT are also deployed at the wellheads at platforms 2. Wellhead pressure transducers WPT are conventional wellhead pressure transducers as well known in the art, and sense pressure at the wellhead, typically at the output of multiple wells after the flows are combined; alternatively, wellhead pressure transducers WPT can be dedicated to individual wells W. FIG. 1 also illustrates wellhead temperature transducers WTT, which sense the temperature of the fluid output from the wells W served by a given platform 2, also at the wellhead; again, wellhead temperature transducers WTT may serve individual wells W at platform 2, if so deployed.

It is contemplated that other downhole and wellhead sensors may also be deployed for individual wells, or at platforms or other locations in the production field, as desired for use in connection with this preferred embodiment of the invention. For example, downhole temperature sensors may also be implemented if desired. In addition, not all wells W may have all of the sensor and telemetry of other wells W in a production field, or even at the same platform 2. Furthermore, injecting wells W will typically not utilize downhole pressure transducers PT, as known in the art.

Figure 2:
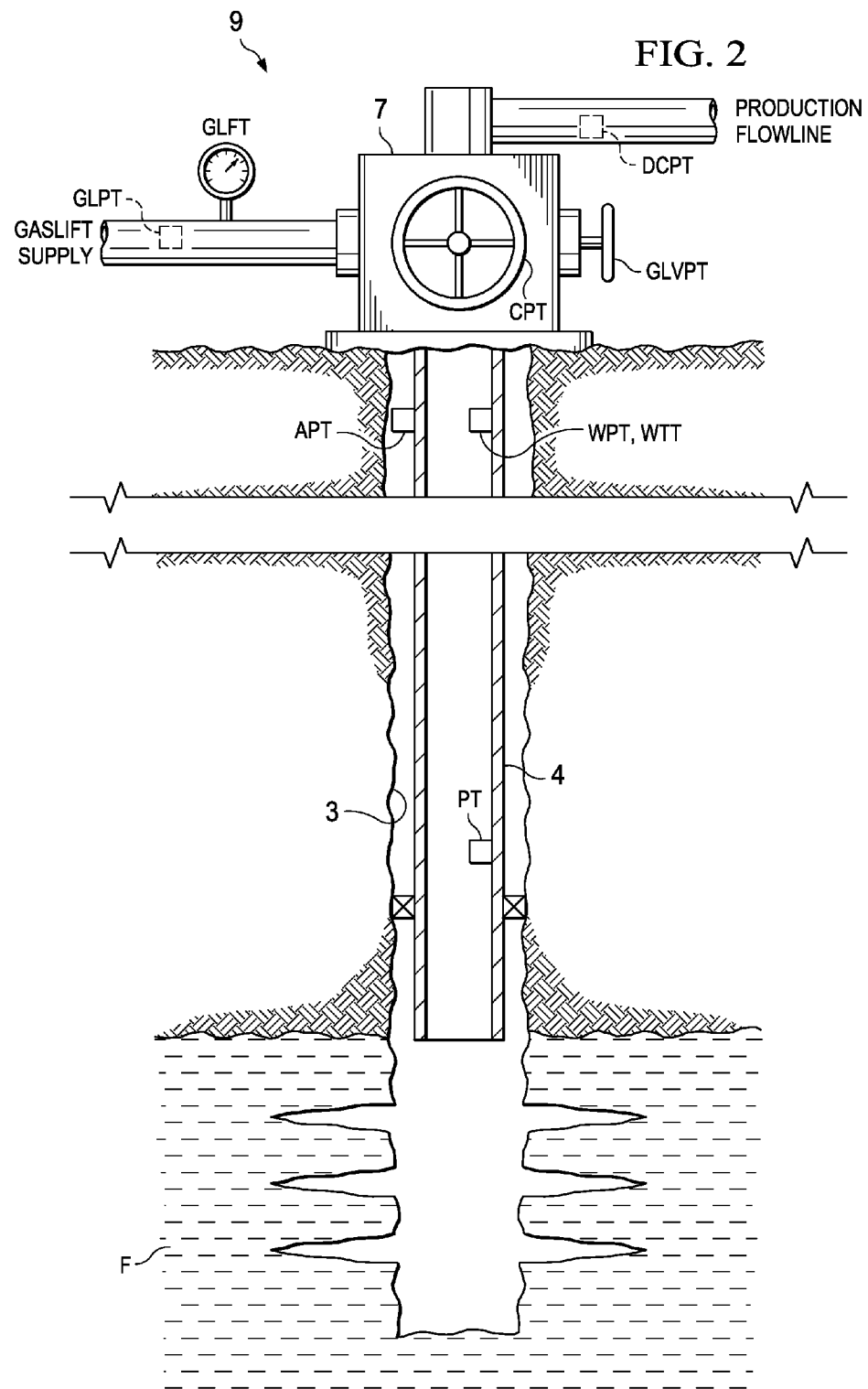
FIG. 2 is a schematic diagram illustrating an example of a well with its associated sensors and transducers as implemented in the system of the preferred embodiment of the invention.

FIG. 2 schematically illustrates an example of the deployment of various pressure, temperature, and position transducers along one of completion strings 4 in well $W_j$ in the production field illustrated in FIG. 1. FIG. 2 illustrates a portion of completion string 4 as disposed in a wellbore that passes into a hydrocarbon-bearing formation F. In this simplified schematic illustration, completion string 4 includes one or more concentric strings of production tubing disposed within wellbore 3, defining an annular space between the outside surface of the outermost production tubing and the wall of wellbore 3. Entries through the production tubing pass fluids from one or more formations F into the interior of the production tubing, and within any annulus between concentrically placed production tubing strings, in the conventional manner. The annular space between wellbore 3 and completion string 4 (and also any annuli between inner and outer production tubing strings) may be cemented to some depth, as desired for the well. Packers (not shown) may also be inserted into the annular space between wellbore 3 and completion string 4 to control the pressure and flow of the production stream, as known in the art. Completion string 4 terminates at the surface, at wellhead 9.

According to the preferred embodiment of the invention, and as known in the art, downhole pressure transducer PT is preferably disposed in completion string 4 at a depth that is above the influx from shallowest hydrocarbon-bearing formation F. As will become apparent from the following description, the shut-in condition of the well is of particular usefulness in the analysis method of the preferred embodiment of this invention. Downhole pressure transducer PT is in communication with data acquisition system 6 (FIG. 1) by way of a wireline or other communications facility (not shown in FIG. 2) in completion string 4.

As mentioned above, additional sensors may also be deployed in connection with completion string 4, for purposes of the preferred embodiment of the invention, for example as shown in FIG. 2. Wellhead pressure and temperature transducers WPT, WTT, respectively, are deployed within production string 4 at or near wellhead 9, for sensing pressure and temperature for well W at the wellhead. In addition, well annulus pressure transducer APT is deployed within the annulus between wellbore 3 and the outermost production tubing of completion string 4, at or near wellhead 9, for sensing the annular pressure near the surface. Other sensors and transducers specific to well W can also be deployed at wellhead 9. As shown in FIG. 2, these additional sensors include choke valve position indicator CPT, which of course indicates the position of choke 7, and thus the extent to which choke 7 is opening or closing the fluid path from completion string 4 to the production flowline. Well W, in the example of FIG. 2, also includes gaslift capability, as conventional in the art, and in connection with which various sensors are provided. On the gas lift supply side, gas lift pressure transducer GLPT and gas lift flow transducer GLFT measure the pressure and flow, respectively, of the gas being supplied to well W for gaslift operation. Gaslift control valve position transducer GLVPT indicates the position of the gaslift control valve. Each of these transducers illustrated in FIG. 2 for well W, and any other transducers utilized either downhole, at wellhead 9, or downstream from wellhead 9 in the production flowline, are coupled to data acquisition system 6 for the platform 2 or other arrangement of wells, so that the measurements can be acquired and forwarded to servers 8 according to the preferred embodiment of the invention, as will be described below and as illustrated in FIG. 1.

As illustrated in FIG. 1, volumetric flow transducers FT can also optionally be deployed in line with each of completion strings 4, for each of the wells supported by each of platforms 2, or plumbed into the production flowline in a shared manner among multiple wells. Such flow transducers FT are of conventional design and construction, for measuring the flow of fluid (including all phases of gas, oil, and water). As will be described in further detail below, the flow from a given well or completion string, for each phase (oil, gas, water) can be determined from pressure transducers PT in combination with measurements of downhole temperature, according to the preferred embodiment of this invention.

Referring back to FIG. 1 for this example of the preferred embodiment of the invention, and as mentioned above, platforms $2_1$, $2_2$ are each equipped with a corresponding data acquisition system $6_1$, $6_2$. Data acquisition systems 6 are conventional computing and processing systems deployed at the production location, and which manage the acquisition of measurements from the sensors and transducers at platforms 2 and in connection with the completion strings 4 at that platform 2. Data acquisition systems 6 also manage the communication of those measurements to shore-bound servers 8, in this embodiment of the invention, such communications being carried out over a conventional wireless or wired communications link LK. In addition, data acquisition systems 6 are each capable of receiving control signals from servers 8, for management of the acquisition of additional measurements, calibration of its sensors, and the like. Data acquisition systems 6 may apply rudimentary signal processing to the measured signals, such processing including data formatting, time stamps, and perhaps basic filtering of the measurements, although it is preferred that the bulk of the filtering and outlier detection and determination is to be carried out at servers 8.

Servers 8, in this example, refer to multiple servers located centrally or in a distributed fashion, and operating as a shore-bound computing system that receives communications from multiple platforms 2 in the production field, and that operates to carry out the analysis of the downhole pressure measurements according to the preferred embodiment of the invention, as will be described in further detail below. Servers 8 can be implemented according to conventional server or computing architectures, as suitable for the particular implementation. In this regard, servers 8 can be deployed at a large data center, or alternatively as part of a distributed architecture closer to the production field. Also according to this preferred embodiment of the invention, one or more remote access terminals RA are in communication with servers 8 via a conventional local area or wide area network, providing production engineers with access to the measurements acquired by pressure transducers PT and communicated to and stored at servers 8. In addition, as will become apparent from the following description, it is contemplated that servers 8 will be capable of notifying production engineers of certain events detected at one or more of pressure transducers PT, and of the acquisition of measurement data surrounding such events. This communication, according to this invention, provides the important benefit that the production engineers are not deluged with massive amounts of data, but rather can concentrate on the measurements at completion strings 4 for individual wells that are gathered at important events, from the standpoint of well and production field characterization and analysis.

While the implementation of the preferred embodiment of the invention illustrated in FIG. 1 is described relative to an offshore production field environment, those skilled in the art having reference to this specification will readily recognize that this invention is also applicable to the management of terrestrial hydrocarbon production fields, and of individual wells and groups of wells in such land-based production. Of course, in such land-based oil and gas production, the wells and their completion strings are not platform-based. As such, each well or completion string may have its own data acquisition system 6 for communication of its transducer measurements to servers 8; alternatively, a data acquisition system may be deployed near multiple wells in the field, and as such can manage the communication of measurements from those multiple wells in similar fashion as the platform-based data acquisition systems 6 of FIG. 1.

According to the preferred embodiments of the invention, as will become apparent from the following description, servers 8 operate to derive estimates of flow rate for each of multiple phases of produced fluid (gas, oil, water) from the pressure, temperature, and position measurements acquired as in the example of FIG. 2. In addition, according to the preferred embodiments of the invention, servers 8 may also operate to deduce an operating state or mode of well W from these measurements, as will be described in further detail. These derivations of rate, phase, and operating mode are obtained by servers 8 by the application of the measurements to one or more computer-operated predictive well models, preferably with the results selected from these derivations by an automated procedure taking account of the measurements themselves.

According to the preferred embodiments of the invention, the well models used by servers 8 to derive rate, phase, and operating mode are based on conventional hydraulic well models as known in the art. These conventional and known hydraulic well models include such models as the PROSPER modeling program available from Petroleum Experts Ltd, the PIPESIM modeling program available from Schlumberger, and the WELLFLOW modeling program available from Halliburton. These models generally operate as a hydraulic model of the well pipe as a primary model, based on physical and thermodynamic laws governing fluid flow. Another model that is useful in connection with the preferred embodiments of the invention is the well-known Perkins choke differential pressure model, as described in Perkins, "Critical and Subcritical Flow of Multiphase Mixtures Through Chokes", SPA Paper No. 20633 (Society of Petroleum Engineers, 1993), incorporated herein by this reference. Other modeling techniques can also be used in place of these conventional hydraulic well models, or included along with those hydraulic well models to add robustness to the overall system. It is also contemplated that other new or modified hydraulic well models can be readily applied to the monitoring system implemented according to the preferred embodiments of the invention, without undue experimentation by those skilled in the art having reference to this specification.

In a simplified sense, the well models used in connection with the preferred embodiments of the invention treat the modeled well analogously to a pipeline incorporating the physical geometry of the well. In some cases, the well model is a one dimensional model calculating fluid properties as a function of length of the well. Other well models can incorporate more than one dimension along all or a portion of the well. For example, fluid flow can be modeled as a function of length and radial distance. As further example, fluid flow can be modeled in three dimensions. In some cases, fluid flow is modeled in one dimension for most of a well and in more than one dimension for a specific portion of the well. For example, in particular areas of the well where flow deviates greatly from one-dimensional consideration, one or more other dimension may be included in that area. By using such simplified models, rate and phase values can be calculated several times each minute.

According to the preferred embodiments of the invention, a number of hydraulic models are available for use in deriving measurements of rate and phase. These hydraulic models calculate rate and phase, and in some cases reservoir pressure or other parameters, by matching calculations of downhole pressure or wellhead temperature (or both) by the well model to the actual measurements of those parameters. One class of these hydraulic models is based on models of both inflow and the production tubing that makes up completion string 4. These models are most useful in situations in which the reservoir pressure is known to a high level of confidence. According to these models, referred to herein as "full" or "inflow-and-tubing" models, the calculation of the phase parameter is optimized to match the measured downhole pressure, or to match the measured wellhead temperature.

Figure 3:
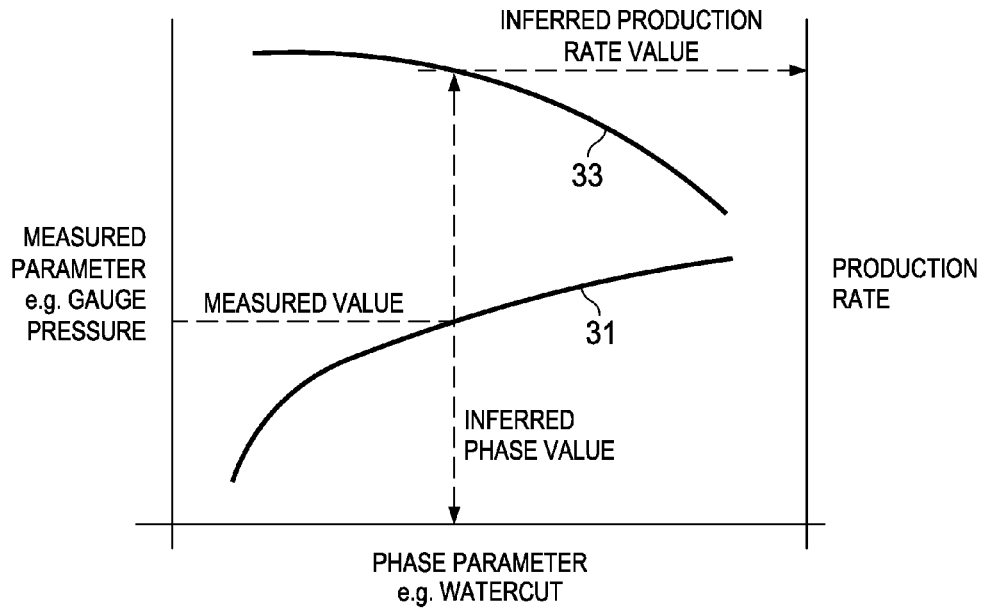
FIG. 3 is a graphical representation of the output of a well model according to the preferred embodiment of the invention.

FIG. 3 illustrates an example of rate and phase calculations using a simplified "inflow-and-tubing" model according to the preferred embodiment of the invention. Curve 31 illustrates the relationship of a phase parameter (e.g., watercut) to a measured parameter such as downhole pressure, in this example, according to the selected tubing and inflow model for a given well W. Curve 33 illustrates the relationship between the phase parameter (e.g., watercut) to an inferred production rate, also according to the same full model. Upon obtaining the measured parameter of downhole pressure, in this example, that measured downhole pressure is applied to the well model for well W from which the measurement was taken, to derive the phase parameter of watercut from curve 31. Once that phase parameter value is deduced from the well model, that phase parameter value is applied to the well model for well model to produce the resulting production rate, via curve 33 of FIG. 3. In this manner, the selected well model for well W is used to produce rate and phase information from a downhole pressure measurement.

As mentioned above, this class of inflow-and-tubing well model can also operate based on a measurement of wellhead temperature, instead of the measured downhole pressure as discussed above.

Another type of well model used in connection with the preferred embodiments of the invention is based only on the hydraulics model of the tubing, and does not model the inflow into the tubing. Because inflow is not modeled by this class of "tubing-only" models, reservoir pressure need not be known or assumed; rather, this class of model is able to infer reservoir pressure from the other measurements. In a general sense, this type of model operates by adjusting the phase parameter and the production rate (i.e., curves 31, 33 of FIG. 3) to simultaneously match the measured downhole pressure and the measured wellhead temperature.

Of course, actual generation of the rate and phase parameter values using a well model according to the preferred embodiments of the invention is not carried out graphically through the use of curves and plots, as suggested by FIG. 3. Rather, as will be described in further detail below, automated programmed numerical and analytical techniques are used to calculate the desired results.

The following Table 1 is an example of the measurements and well models used in a preferred embodiment of the invention, for purposes of understanding the context of the present invention. In this example, the models applied include the "Perkins Choke" model, and the hydraulics well models in different operating modes or options, depending on the available measurement data as will be illustrated. The hydraulic well models may correspond to the PROSPER models noted above, or additionally or alternatively to other hydraulic well models, including such other similar hydraulic well models known in the art or which may later be developed. It is contemplated that the scope of this invention as hereinafter claimed is not limited to the particular models that may be used; as such, these particular models are presented by way of example only. In addition, as evident from Table 1, the example of a PROSPER choke model is also available and may also be applied in combination with the other models. As known in the art, a "choke" model infers rate and phase based on a measured differential pressure drop across the production choke valve, and using an estimate of gas-oil ratio or watercut. The hydraulics models, as described above, derive the rate and phase estimates that match the measurements of downhole pressure or wellhead temperature, for example. Further in addition to these enumerated models, user-defined numerical equations can also be incorporated into the rate and phase determination, depending on the available measurement data and also upon the equations so defined by the user.

TABLE 1

| Model name/options | | Wellhead pressure | Wellhead temperature | Downhole pressure | Reservoir pressure | Watercut (WGR) | Gas-oil ratio (GOR) or condensate-gas ratio (CGR) | Gaslift injection rate |
|---|---|---|---|---|---|---|---|---|
| Perkins choke model | | RQ | CALC | n/a | n/a | AS | AS | RQ |
| Full model (no phase matching) | Hydraulic inflow-and-tubing models | RQ | CALC | CALC | AS | AS | AS | RQ |
| Full model matched to DHP (DHP) | | CALC | CALC | RQ | AS | AS | AS | RQ |
| Full model (DHP) with adjusted WGR | | RQ | CALC | RQ | AS | CALC | AS | RQ |
| Full model matched to WHT with adjusted WGR | | RQ | RQ | CALC | AS | CALC | AS | RQ |
| Full model (DHP) with adjusted GOR/CGR | | RQ | CALC | RQ | AS | AS | CALC | RQ |
| Full model (WHT) with adjusted GOR/CGR | | RQ | RQ | CALC | AS | AS | CALC | RQ |
| Full model (DHP) with adjusted gaslift value | | RQ | CALC | RQ | AS | AS | AS | CALC |
| Full model (WHT) with adjusted gaslift | | RQ | RQ | CALC | AS | AS | AS | CALC |
| Tubing model (DHP) | Tubing-only model (no inflow modeling) | RQ | CALC | RQ | CALC | AS | AS | RQ |
| Tubing model (WHT) | | RQ | RQ | CALC | CALC | AS | AS | RQ |
| Tubing model (DHP and WHT), adjust WGR | | RQ | RQ | RQ | CALC | CALC | AS | RQ |
| Tubing model (DHP and WHT), adjust GOR | | RQ | RQ | RQ | CALC | AS | CALC | RQ |
| Tubing model (DHP and WHT), adjust gaslift | | RQ | RQ | RQ | CALC | AS | AS | CALC |
| PROSPER choke model | | RQ | RQ | n/a | n/a | AS | AS | RQ |
| User-defined empirical rate estimates | | User-defined | User-defined | User-defined | User-defined | User-defined | User-defined | User-defined |
| Well-specific rate measurements | | n/a | n/a | n/a | n/a | n/a | n/a | n/a |

Parameter values (RQ = required measurement, AS = assumed value, CALC = calculated value)

In Table 1, the phase matching approach of "DHP" refers to matching the calculated rates and phase relative to downhole pressure, while the phase matching of "WHT" refers to matching the calculated rates and phase relative to wellhead temperature. As evident from Table 1, the tubing-only models match rates and phases to both downhole pressure and wellhead temperature, given the additional degree of freedom resulting from no inflow modeling. In addition, as shown in Table 1, user-defined empirical rate estimates can be included in the set of well models 27; for this user-defined case, the particular parameters used in order to derive rate and phase are defined by a human user on a case-by-case basis, and as such may not rely on any specific combination of sensor inputs. Examples of such user-defined empirical rate estimates can include a decline curve analysis from historic test data, and a combination of asset-defined empirical correlations that are not based on physical models. Table 1 also illustrates a "well-specific rate measurement" as included in the set of well models 27, which refers to those situations for which a flow transmitter FT is present at well W that directly outputs rate and phase information for that well; when present and operable, such direct rate and phase measurement may be taken in preference to the calculated values from the other well models 27.

As is also evident from this Table 1 of models and inputs, the availability of certain measurements and unavailability of other measurements can result in the selection of one model versus another. For example, if a reliable downhole pressure measurement is available but a reliable wellhead temperature is not available, the tubing model can be used to derive rate and phase values, along with reservoir pressure and wellhead temperature, assuming values for watercut and gas-oil ratio, by matching the rates and phases to DHP. Conversely, if the downhole pressure measurement is not available or reliable, but wellhead temperature can be reliably measured, the tubing model can be used to calculate rate and phase values, along with reservoir pressure and downhole pressure, assuming values for watercut and gas-oil ratio, by matching the rates and phases to WHT. The interplay among the various models not only provides calculations based on the available and reliable measurements, but also can improve the robustness of the rate and phase calculation by confirmation of calculated values among the multiple models, as will be discussed below.

As evident from the example shown in Table 1, certain model parameter values applied to the models are "assumed" values. These assumed values can be based on well tests or other previously-measured values for those parameters. Or, alternatively, the assumed values for these parameters can be values that were generated by other models, or models for other wells in the production field, or even simply taken from a user input.

According to a preferred embodiment of this invention, however, these assumed values, which are conventionally considered to be constant values, are expressed as functions. It has been discovered, according to this invention, that mathematical functions can be used in place of certain constants to create a dynamic model. Examples of values that conventional models treats as constants, and that can be evaluated as functions according to the preferred embodiment of this invention, include reservoir pressure, productivity index, gas-oil ratio, and watercut. These parameters are illustrated in Table 1 as "assumed" values. According to the preferred embodiments of the invention, one or more of these "assumed" parameter values are expressed as a function of time or a function of another parameter. For example, reservoir pressure may be expressed as a function of time or of cumulative production or of both. Watercut may be expressed as a function of time, while productivity index may be expressed as a function of a time variable, and as a function of one or more of rate, watercut or gas-oil ratio. It is contemplated that the functional expressions used for these "assumed" parameters can be readily evaluated for a given application of the model to current measurements; for example, if time is a variable, a timestamp of the measurement data or some other indication of the effective time for which the model calculations are to be performed can be easily applied to the time variable function. For example, if a time-rate of change of reservoir pressure can be estimated from previous calculations, the input parameter value of reservoir pressure into the selected model can be readily calculated from previous measurements and estimates, and used as a current reservoir pressure value for the model along with current pressure and temperature measurements. The "longevity" of previous measurements and thus the longevity of the model itself can be greatly increased. This approach also avoids the need for iterative changes to, or iterative optimization of, the well model, and also greatly assists the providing of accurate rate and phase information on a near-real-time and continuous basis.

Figure 4:
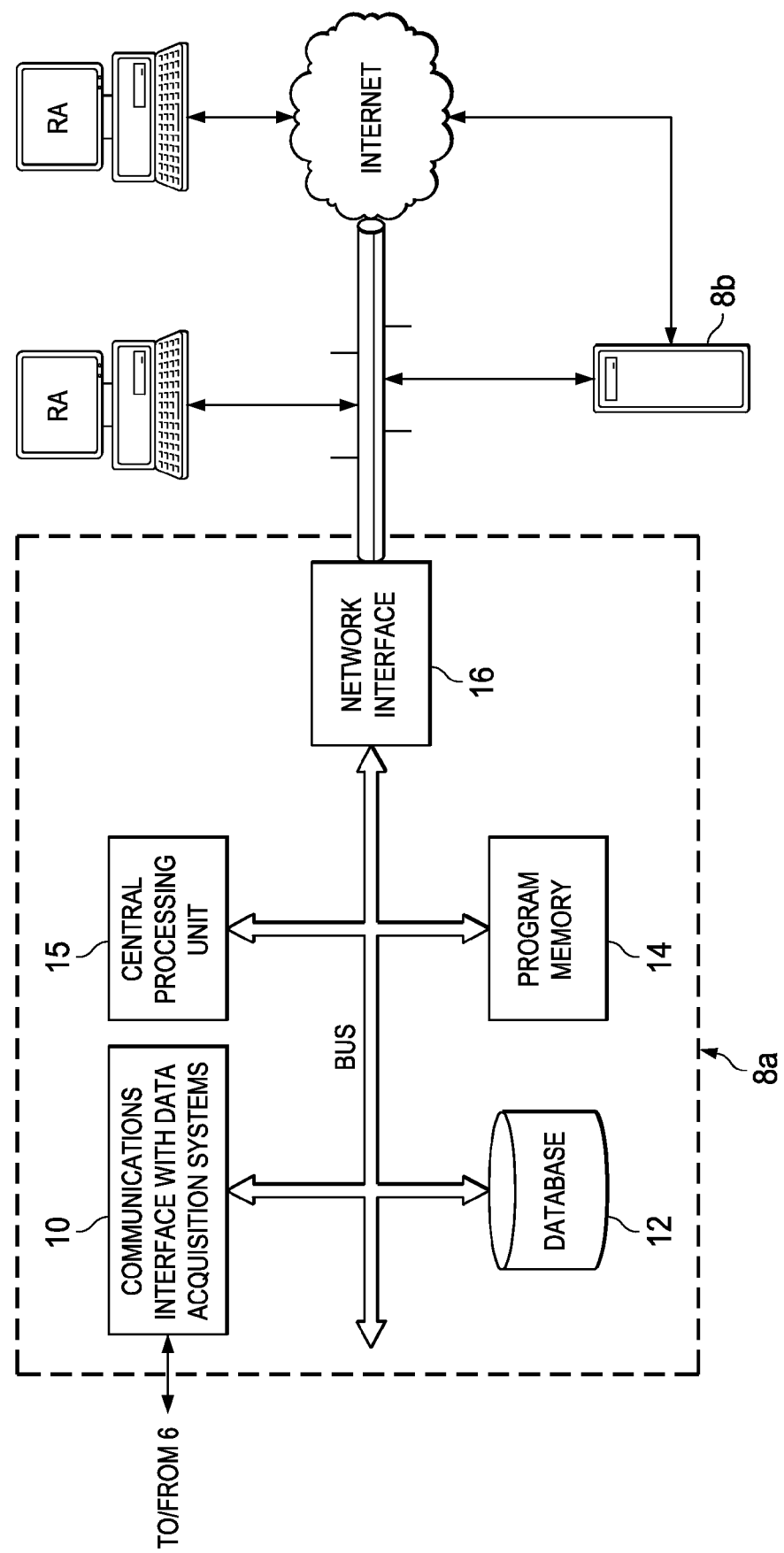
FIG. 4 is an electrical diagram, in block and schematic form, of a computer system such as a server implementing the analysis system of the preferred embodiment of the invention.

FIG. 4 illustrates an example of the construction and architecture of server 8a, according to the preferred embodiment of the invention. The arrangement of server 8a shown in FIG. 4 is presented by way of example only, it being understood that the particular architecture of server 8a can vary widely from that shown in FIG. 4, depending on the available technology and on the particular needs of a given installation. Indeed, any conventional server architecture of suitable computational and storage capacity for the volume and frequency of the measurements involved in the operation of this preferred embodiment of the invention can be used to implement server 8. As such, the construction of server 8a shown in FIG. 4 is presented at a relatively high level, and is intended merely to illustrate its basic functional components according to one arrangement.

In this example, communications interface 10 of server 8a is in communications with data acquisition systems 6 at platforms 2. Communications interface 10 is constructed according to the particular technology used for such communication, for example including RF transceiver circuitry for wireless communication, and the appropriate packet handling and modulation/demodulation circuitry for both wired and wireless communications. Communications interface 10 is coupled to bus BUS in server 8a, in the conventional manner, such that the measurement data received from data acquisition systems 6 can be stored in data base 12 (realized by way of conventional disk drive or other mass storage resources, and also by conventional random access memory and other volatile memory for storing intermediate results and the like) under the control of central processing unit 15, or by way of direct memory access. Central processing unit 15 in FIG. 4 refers to the data processing capability of server 8a, and as such may be implemented by one or more CPU cores, co-processing circuitry, and the like within server 8a, executing software routines stored in program memory 14 or accessible over network interface 16 (i.e., if executing a web-based or other remote application). Program memory 14 may also be realized by mass storage or random access memory resources, in the conventional manner, and may in fact be combined with data base 12 within the same physical resource and memory address space, depending on the architecture of server 8a.

Server 8a is accessible to remote access terminals RA via network interface 16, with remote access terminals RA residing on a local area network, or a wide area network such as the Internet, or both (as shown in FIG. 4). In addition, according to this preferred embodiment of the invention, server 8a communicates with another server 8b via network interface 16, either by way of a local area network or via the Internet. Server 8b may be similarly constructed as server 8a described above, or may be constructed according to some other conventional server architecture as known in the art; in any event, it is contemplated that server 8b will include a central processing unit or other programmable logic or processor, and program memory or some other capability for storing or acquiring program instructions according to which its operation is controlled. As will be described in further detail below, servers 8a, 8b are arranged to operate different software components from one another, according to this preferred embodiment of the invention. As mentioned above and as will be apparent to those skilled in the art having reference to this specification, servers 8a, 8b may be realized by many variations and alternative architectures, including both centrally-located and distributed architectures, to that shown in FIG. 4 and described above.

Figure 5:
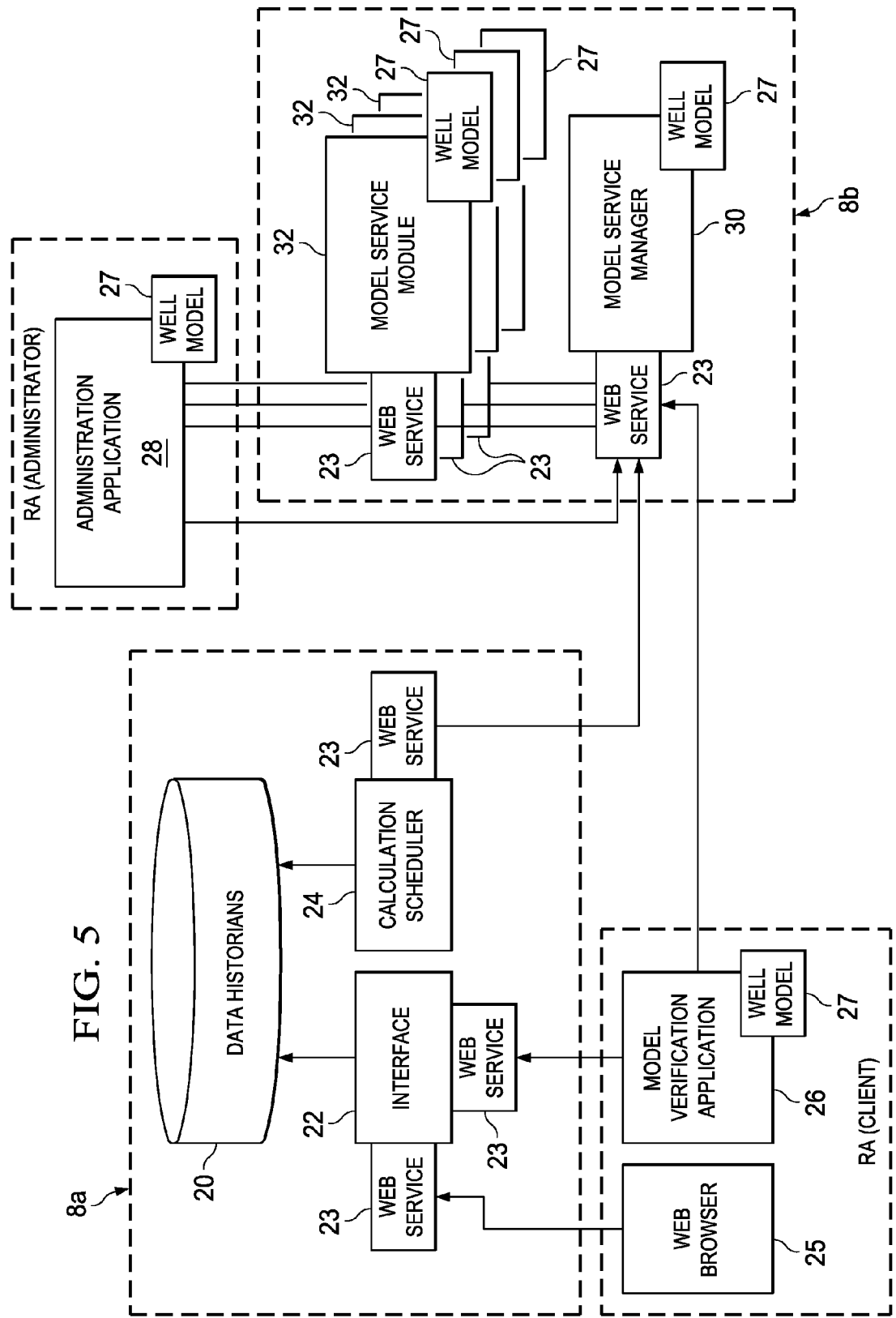
FIG. 5 is a block diagram illustrating the software architecture implemented in the system computing resources of FIG. 4, implementing the analysis system of the preferred embodiment of the invention.

FIG. 5 illustrates an example of a software architecture realized at servers 8a, 8b, and remote access terminals RA, by way of which the monitoring system of this preferred embodiment of the invention is realized. The software modules and applications illustrated in FIG. 5 as being performed by or resident upon a particular computer resource (server 8a, server 8b, remote access terminals RA) are a preferred embodiment of this invention, as this arrangement is believed to be particularly beneficial in the applications and uses of this invention regarding conventional hydrocarbon production fields. It is contemplated that those skilled in the art having reference to this specification may vary the realization of the software architecture of FIG. 5, for example by a different arrangement of services 8a, 8b or by realizing more or fewer applications and modules on different ones of the computer resources. It is also contemplated that those skilled in the art having reference to this specification will also comprehend that the software architecture itself can vary from that shown in FIG. 5 and described herein, without departing from the scope of the invention.

It is contemplated that the various software modules illustrated in FIG. 5 for implementing the monitoring system of this embodiment of the invention constitute computer software programs or routines, or packages of programs or routines, that are executed by the central processing unit (e.g., central processing unit 15 of server 8a in FIG. 4) of the illustrated computer resource. As such, it is contemplated that these computer software programs illustrated in FIG. 5, as well as such higher level programs (not shown) controlling the overall operation of the system, are stored in program memory of each of the computer resources of FIG. 5 (e.g., program memory 14 of servicer 8a, as shown in FIG. 4), or are otherwise made available to these computer resources. In this regard, it is contemplated that these computer programs, packages, modules, and software systems may be provided to the computer resources of FIG. 5 by way of computer-readable media, or otherwise stored in program memory or other conventional optical, magnetic, or other storage resources at those computer resources, or communicated thereto by way of an electromagnetic carrier signal upon which functional descriptive material corresponding to these computer programs is encoded. In addition, it is contemplated that the location at which one or more of these computer programs is resident may be different from the computer resource executing that computer program, such as in the case of the so-called "web-based" application programs. These and other variations on the hardware and software architecture of this preferred embodiment of the invention are contemplated to be within the scope of the invention as hereinafter claimed, as will be recognized by the skilled reader of this specification.

As shown in FIG. 5, server 8a includes one or more data historian software modules 20. These data historian software modules 20 manage the storage of incoming measurement data from data acquisition systems 6 at platforms 2, in the example of FIG. 1, as well as the storage and access of these incoming measurement data by the other software modules of the architecture of FIG. 5. In addition, data historian modules 20 also manage the storage of rate, phase, operating state, and other reservoir performance parameters determined by the monitoring system according to this embodiment of the invention.

Server 8a also executes interface module 22, which communicates with remote access terminals RA via web service functions 23. Each web service function 23 at server 8a, and elsewhere in this system, is realized by a conventional software system that supports interoperable machine to machine interaction over the network, and may be realized by way of a web application program interface, for example by handling XML messages, as known in the art. Interface module 22 provides user access to the monitoring system of the preferred embodiment of the invention, for example by way of web browser application 25 running on a client remote access terminal RA as shown in FIG. 5. Interface module 22 thus responds to HTTP commands from client remote access terminal R, received via the corresponding web service 23, and generates the corresponding web page or other interactive display of field data, calculated parameters, and other information requested by the human user. Web browser application 25 is contemplated to be the primary output module to the human operator, for purposes of monitoring the well and reservoir assets, according to this preferred embodiment of the invention.

In addition, another web service 23 associated with interface module 22 at server 8a communicates with model verification application 26, also resident or executing at client remote access terminal RA. As will be described in further detail below, in this preferred embodiment of the invention, model verification application 26 is a standalone application that permits the human user (e.g., reservoir engineer or other operator) to manage the well models used by the monitoring system of the preferred embodiment of the invention, to verify the model results as produced by the monitoring system, uploading new or updated models into the system, and otherwise maintain the models used by the system. Verification and adjustment of these well models and reservoir models can be carried out by the human operator via model verification application 26. This verification and adjustment can be based on actual data acquired from the field, for example by downhole pressure transducers PT and wellhead transducers WPT, WTT, FT as shown in FIG. 1; in addition, extrinsic data from well tests and the like may also be input by the human operator, and used in model verification application 26 to so verify and adjust the current well models. As evident from FIG. 5, model verification application 26 preferably has access to its own well model 27, or well model package, as useful in such verification.

Server 8a also executes calculation scheduler module 24 in this embodiment of the invention. Calculation scheduler module 24 is a software module or package that processes the measurement data stored in database 12 of server 8a, under the control of data historians 20. The processing of this measurement data includes such filtering or smoothing as desired by the monitoring system, as may be indicated by other modules in the system itself, or as may be indicated by user input. In addition, calculation scheduler module 24 also initiates pre-scheduled monitoring analysis, according to the preferred embodiment of the invention, by way of which monitoring of rate, phase, operating mode, etc. of one or more wells W is carried out periodically and automatically, without requiring user initiation or invocation.

The monitoring system of this preferred embodiment of the invention also includes one or more online servers 8b on which the various predictive well models reside and are executed, in response to current and stored measurements for a given well W forwarded from server 8a. In this example of the software architecture of the system as illustrated in FIG. 5, online server 8b includes model service manager module 30, which interfaces with server 8a by way of web service function 23, and which itself is an application that executes the calculations in an automated manner, based on one or more selected well models 27, upon request by calculation scheduler module 24 of server 8a, and upon data communicated thereto by server 8a, such data including temperature and pressure measurements acquired from a well W and associated with a particular point in time, along with other information including assumed or evaluated model parameters and the like. Model calculations executed by model service manager module 30 can also be requested by model verification application 26 of client remote access terminal RA. According to this architecture, model service modules 32 also reside at online server 8b, with web service modules 23 as interfaces, and operate to execute well models 27 in a "co-processor" manner, instantiated by model service manager module 30 in server 8b. In this architecture, multiple model service modules 32 are provided, each capable of applying a selected one of well models 27 to a data set, all under the management of model service manager 30. A single instance of model service manager module 30 can manage multiple instances of model service modules 32; it is contemplated that model service manager module 30 can select and associated any one of the available well models 27 for each of the model service modules 32 that it is managing. Upon evaluation of well models 27 by model service manager module 30 and model service modules 32, the results, including rate and phase calculations and the like, are communicated from server 8b back to server 8a, over the network.

Figure 6:
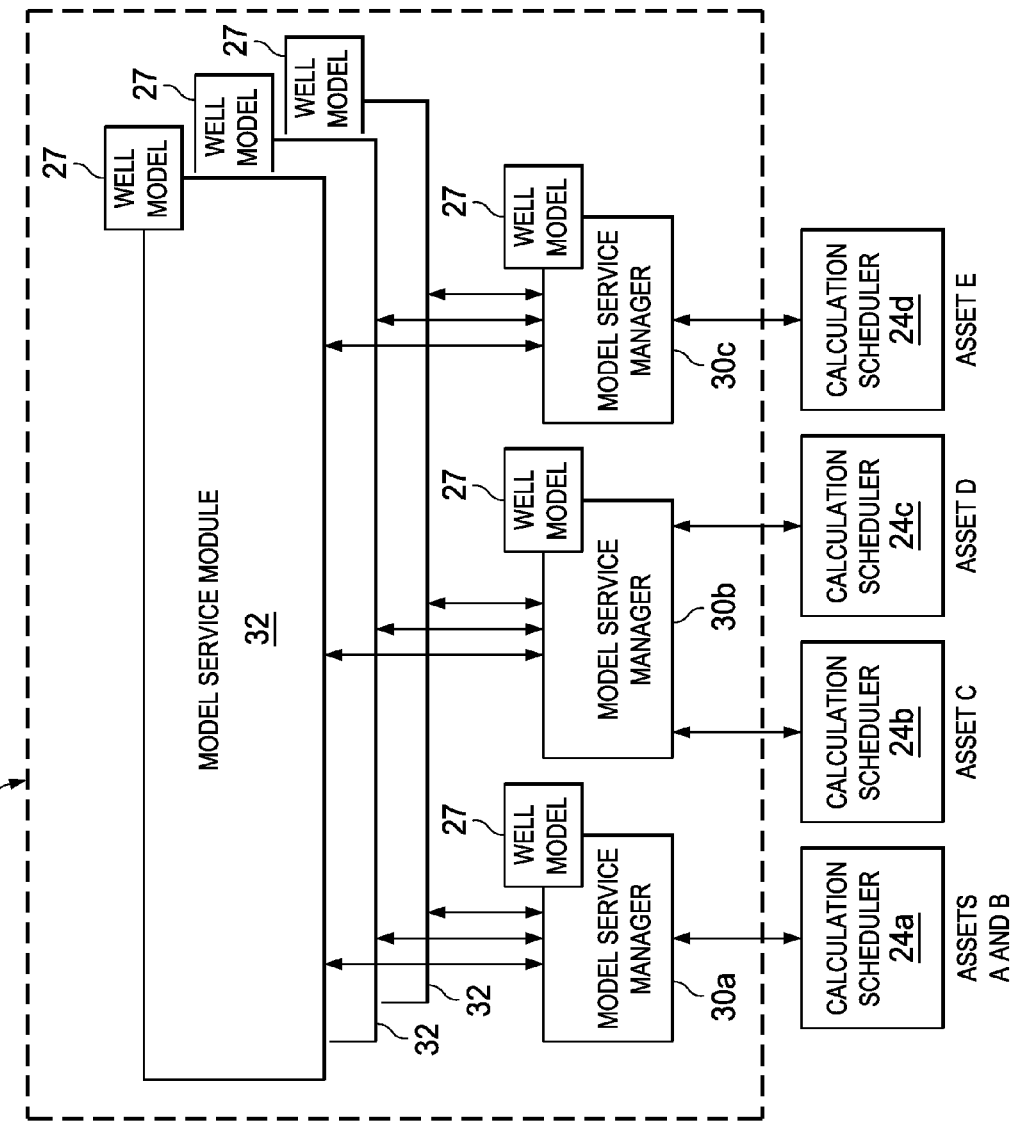
FIG. 6 is a block diagram illustrating the software architecture implemented in the system computing resources of FIG. 4, implementing the analysis system of the preferred embodiment of the invention in a multi-asset application.

While the software architecture according to the preferred embodiment of the invention is described above for a single asset, this architecture is readily adaptable to a multiple-asset environment, covering multiple platforms 2 within a given production field, or wells located in multiple separate production fields, if desired. FIG. 6 illustrates the software architecture of online server 8b as deployed for a multiple-asset implementation. In this example, multiple instances of model service manager modules 30a through 30c are instantiated at online server 8b, each in communication with one or more calculation scheduler modules 24a through 24d at corresponding ones of multiple servers 8a. In this example, calculation scheduler 24a is in communication with model service manager module 30a, and is monitoring rate and phase information for two assets ("A" and "B"). Two calculation schedulers 24b, 24c are in communication with another instantiation at online server 8b, namely model service manager module 30b; calculation scheduler 24b and calculation scheduler 24c carry out the rate and phase monitoring for separate assets ("C" and "D", respectively). Calculation scheduler 24d is in communication with a third model service manager module 30c at online server 8b, for purposes of monitoring yet another production asset ("E").

In this multiple-asset realization, each of model service manager modules 30a, 30b, 30c can manage any one of model service modules 32, and indeed can manage multiple model service modules 32 if required to carry out its tasks. Conversely, each of model service modules 32 can service any one of model service manager modules 30a, 30b, 30c. In each case, model service manager modules 30a, 30b, 30c select and manage the particular well model 27 used by the model service modules 32 that it manages.

Referring back to FIG. 5, an additional remote access terminal RA is illustrated as supporting and executing administration application 28, in combination with a selected well model 27. This remote access terminal RA executing administration application 28 is in the role of an administrator for the system and as such, in this example of the preferred embodiment of the invention, has access to model service manager module 30 and each of model service modules 30 resident at online server 8b. Under the operation of a human operator, administration application 28 monitors and troubleshoots model service manager module 30 and each of model service modules 30. For example, operational logs of model service manager module 30 and model service modules 30 can be reviewed, and the operational results of those modules 30, 32, can be reviewed and analyzed by the human operator. Configurations of model service manager module 30 and model service modules 30 at online server 8b can be amended via administration application 28. Specific calculation requests by a selected one of model service manager module 30 and model service modules 30 can also be made by administration application 28, as may be useful in connection with the monitoring system of the preferred embodiment of the invention.

Figure 7:
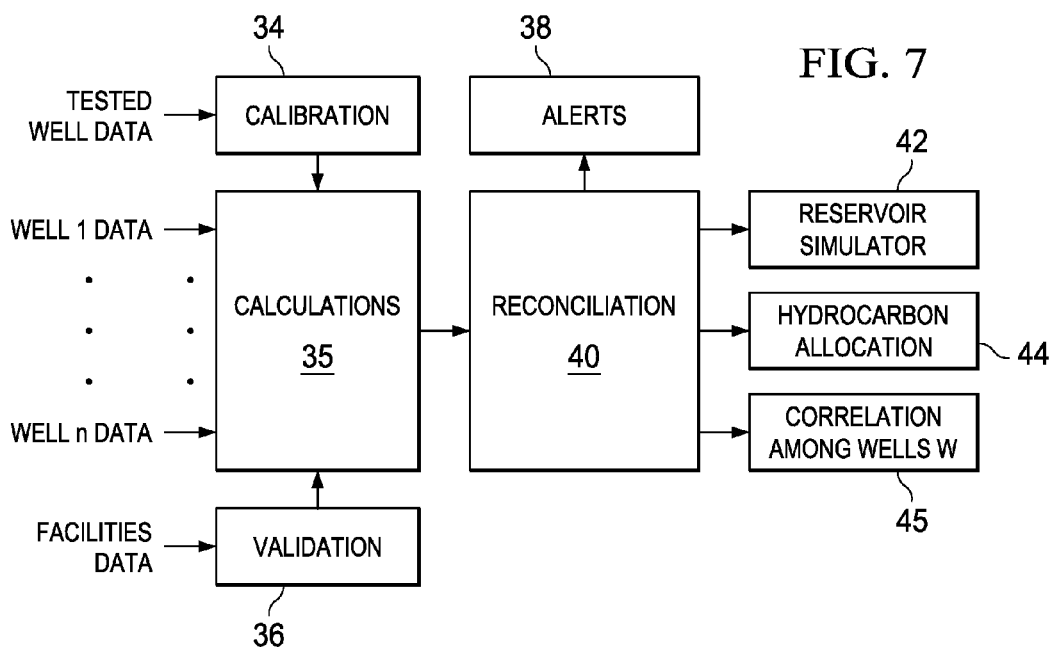
FIG. 7 is a schematic diagram illustrating information processing steps in an embodiment of this invention.

Referring now to FIG. 7, the general operation of the rate and phase monitoring system described above, according to the preferred embodiment of the invention, will now be described. It is contemplated that the operations of FIG. 7, as illustrated in that Figure and in the more detailed Figures described herein, are carried out by the execution of computer programs by the central processing units and other programmable logic in the various computing resources shown in the example of FIG. 4, using the software architecture described above in connection with FIGS. 5 and 6. It is further contemplated that these computer programs can be readily created by those skilled in the art having reference to this specification, from the functional descriptions provided in this specification, using conventional programming skill and technique in combination with existing software packages as appropriate, and without undue experimentation. It is also contemplated that those skilled readers can vary this operation from that described in this specification without departing from the scope of the invention as claimed. Accordingly, this operation of the monitoring system according to the preferred embodiment of the invention is described by way of example only.

Data from one or more wells W in a field are collected and fed in a near-real-time fashion to calculation process 35. This "near-real-time" data collection refers to the measurements being acquired during operation of each monitored well W at relatively frequent intervals (e.g., as often as once per second), with the data corresponding to those measurements associated with a time of collection by data acquisition systems 6, and the time-associated data forwarded to servers 8 (FIG. 1). It is contemplated that this forwarding of acquired data by data acquisition systems 6, to servers 8, will be relatively frequent, but not necessarily on a measurement-by-measurement basis. For example, current-day downhole and wellhead transducers acquire measurements as frequently as once per second. It is contemplated that data acquisition systems 6 will obtain and process those measurements for a given well over some time interval and thus periodically forward those processed measurements for the interval to servers 8. For example, it is contemplated that the forwarding of acquired data to servers 8 will occur on the order of a few times a minute (e.g., every fifteen seconds). As will be described in further detail below, calculation process 35 applies these received measurement data to one or more models to estimate rate and phase, and operating state.

It is also contemplated that calculation process 35 will likely not be performed for a given well W each time that data acquisition systems 6 forward data to servers 8 for that well W. Rather, it is contemplated that calculation process 35 will be performed periodically, for example at a period selected or determined by a human user. For example, it is contemplated that, for many applications, the frequency with which calculation process 35 is carried out will vary from as frequently as on the order of about once every five minutes, to on the order of about once every one or two hours. However, it is contemplated that the monitoring of this embodiment of the invention is "continuous", in that this operation of calculation process 35 proceeds in an automated manner, according to such a selected frequency or periodicity, without requiring initiation by a human user. Of course, it is also contemplated that a human user can initiate calculation process 35 "on demand", separately from its continuous operation in this manner.

Figure 8:
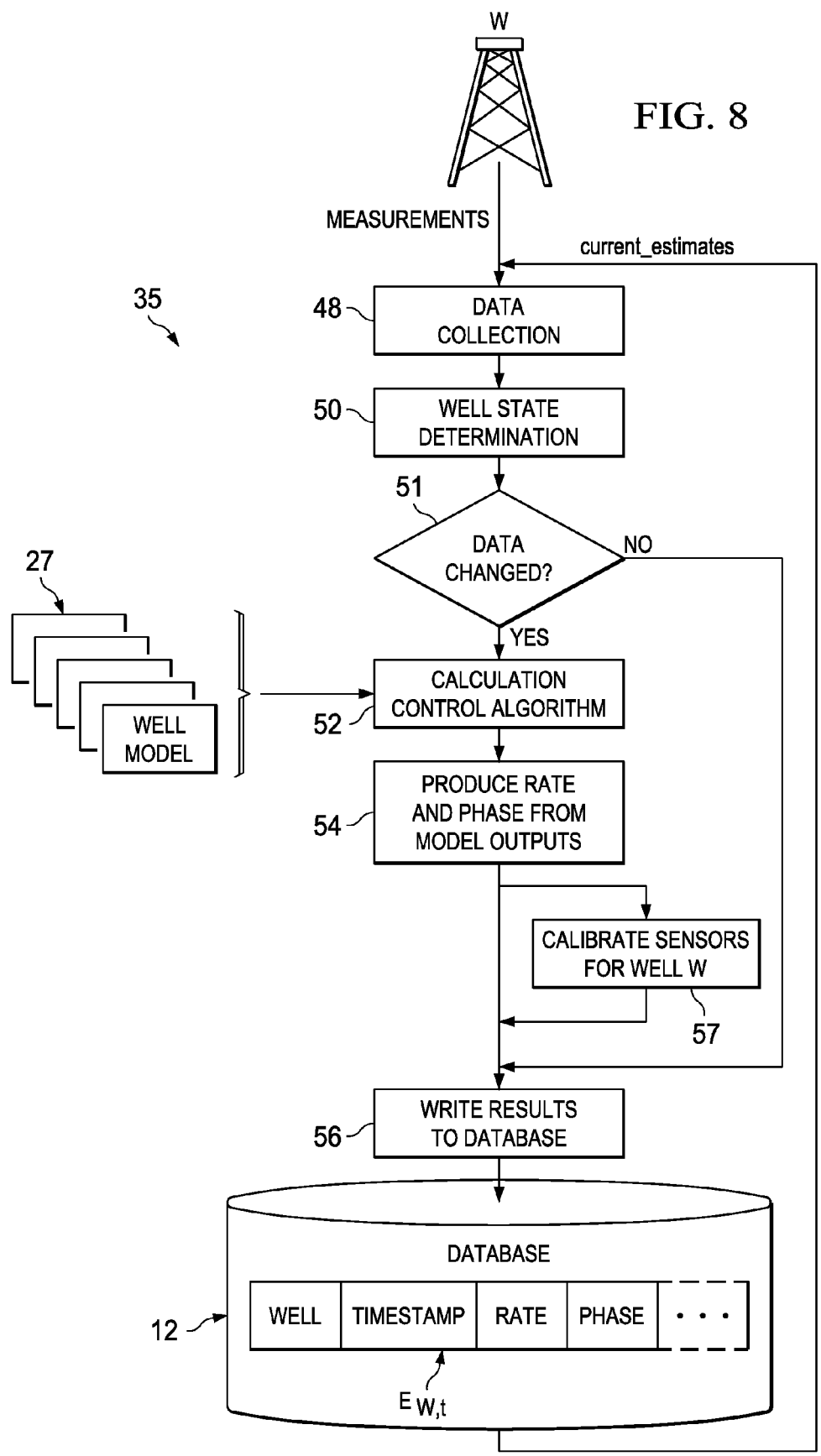
FIG. 8 is a flow diagram illustrating the operation of an automated analysis method according to the preferred embodiment of the invention.

FIG. 8 illustrates the operation of calculation process 35 in further detail. Each instance of rate and phase calculation process 35 begins with process 48, in which server 8a collects data from well W and database 12. In particular, referring to the architecture of FIG. 5, calculation scheduler module 24 manages data collection process 48, in cooperation with data historian modules 20. According to this preferred embodiment of the invention, the measurement data collected in data collection process 48 can include data corresponding to measurements of pressure and temperature at the wellhead, measurements of downhole pressure and temperature, measurements of pressure and temperature upstream and downstream of the wellhead control valve or valves (choke and gaslift), the position of wellhead control valves (choke and gaslift), and properties of fluid samples. Of course, not all of these measurements will be available from every well W, or at all times. In addition, it is contemplated that the frequency with which these measurements are acquired will vary from measurement to measurement.

In conventional monitoring of hydrocarbon wells, sensor data is typically interpreted as unchanged unless it changes more than a specified amount—a process often referred to as "dead-banding". Dead-banding is often useful because it can reduce the necessary data transmission capability of the system, or reduce the volume of data transmitted, or simply in maintaining a "legacy" approach to the monitoring. However, dead-banding inherently limits the resolution of sensors, and can also have the effect of masking the actual performance of the sensors. It is preferred, according to this invention, that sensor measurement data is collected in process 48 without such dead-banding. This non-deadbanding approach enables predictive well models 27 to compensate for inaccurate sensors, or even calibrate the output from the inaccurate sensors, as will be described below.

In addition, data collection process 48 acquires current estimates of certain well and reservoir parameters from database 12, via data historian modules 20. As shown in FIG. 8, database 12 stores rate and phase values that have been previously calculated for wells W, for example in database entries such as entry $E_{W,t}$. In this example, entry $E_{W,t}$ includes stored values for rate and phase, along with an identifier of the well for which those rate and phase values correspond, and a timestamp indicating the time (including date) of the measurements to which those rate and phase correspond. Other information, including measured, assumed, and calculated values, may also be included in each entry $E_{W,t}$ in database 12. As such, in data collection process 48, the current estimates of well and reservoir parameters for well W that are to be applied to the next rate and phase calculation instance are retrieved from one or more corresponding entries $E_{W,t}$. The current estimates retrieved from database 12 for well W in process 48 include the most recently calculated or otherwise estimated phase conditions for the flow from well W (e.g., watercut, gas-oil ratio, etc.), and reservoir performance (e.g., reservoir pressure, productivity index, etc.) of the reservoir into which well W is deployed. According to the preferred embodiment of this invention, one or more of these current estimates can be derived by evaluating a function, rather than by adopting an assumed value. As known in the art, conventional well models operate on the assumption that certain parameters can be expressed constants for a given well W, or over a particular reservoir. Examples of values that these conventional well models typically treat as constants include reservoir pressure, productivity index, gas-oil ratio, and water cut, as evident from Table 1 described above (i.e., in connection with the parameter values indicated as "AS", meaning "assumed" values). As such, these conventional well models typically operate at a "snapshot" point in time, applying the most recent measurements from well tests, values determined by other modeling systems, and the like to the model, along with the assumed constants.

The monitoring system and method according to the preferred embodiment of this invention, however, is intended to operate in a near-real-time manner, based on the relatively high frequency with which new downhole and wellhead measurements can be obtained. But not all parameter values are obtained at each measurement point in time, nor are estimates calculated for each point in time at which measurements are obtained, even though the conditions of well W being monitored may be changing over time or as production continues. According to the preferred embodiment of the invention, therefore, one or more of the "assumed" values applied to well models 27 is expressed as a function, rather than as a constant, and that function is evaluated at the point in time, or in cumulative production quantity, or the like corresponding to the time at which the current measurements were acquired. Some of these parameters that can be expressed as a function rather than a constant include reservoir pressure, which may be expressed as a function of time or of cumulative production or both; productivity index, which may be expressed as a function of time; and one or more of the parameters of flow rate, water cut, or gas-oil ratio, each of which may be expressed as a function of time or cumulative production quantity. For example, if reservoir pressure at a given well W has been observed to be decreasing over time, based on well test results or even on the recent history output by the monitoring system of this preferred embodiment of the invention, the observed time-rate-of-change of reservoir pressure can be used to derive a time-based function for reservoir pressure (by way of extrapolation), in effect predicting the reservoir pressure at a current point in time based on those past observed trends. The functions may be relatively simple linear functions of time or cumulative production quantity, as the case may be, or may be expressed as higher-order functions if desired and if useful in improving the accuracy of the evaluated result. By treating these parameters as functions in this manner, the "longevity" of the well models can be extended, such that the accuracy of these models as currently configured can continue for a substantial time without additional well tests and the like. In any case, the evaluated results of these functions are then collected by process 48, in lieu of assumed constant values, and applied to the well models 27 in the manner described below, to derive rate and phase estimates.

Once these data and estimates are collected in process 48, server 8a next performs process 50 to determine the current operating state of well W based on these measurements. It is contemplated that the particular well models to which the collected measurement data are applied are preferably selected according to the current operating state of well W. For example, certain hydraulics well models may be more suitable for use in steady-state production, while other hydraulics well models may be more suitable during the transient period following start-up of production. In addition, these well models may depend on the particular well W itself, or perhaps on previously observed characteristics of the production field at which well W is located. For example, the phase composition of the fluid from a well W may be dominated by gas for a few hours following startup (during which certain well models may be more appropriate), but may have little or no gas phase thereafter (during which other well models may be more appropriate, and during which other parameters such as water composition may be more important). As such, according to this embodiment of the invention, process 50 determines the current well operating state of well W.

With reference to FIG. 5, it is contemplated that this process 50 will be executed by server 8a as part of calculation scheduler module 24. This determination of current operating state for well W is performed by calculation scheduler module 24 in combination with model service manager module 30 and model service module 32, based on the most recent measurements obtained from well W and stored by data historian modules 20, as will now be described with reference to FIG. 12, by way of example. In general, the measurements utilized in this determination of operating state include the positions of choke valve 7 and other valves at wellhead 9, and the variation over recent time of pressure and temperature measurements at well W.

Figure 12:
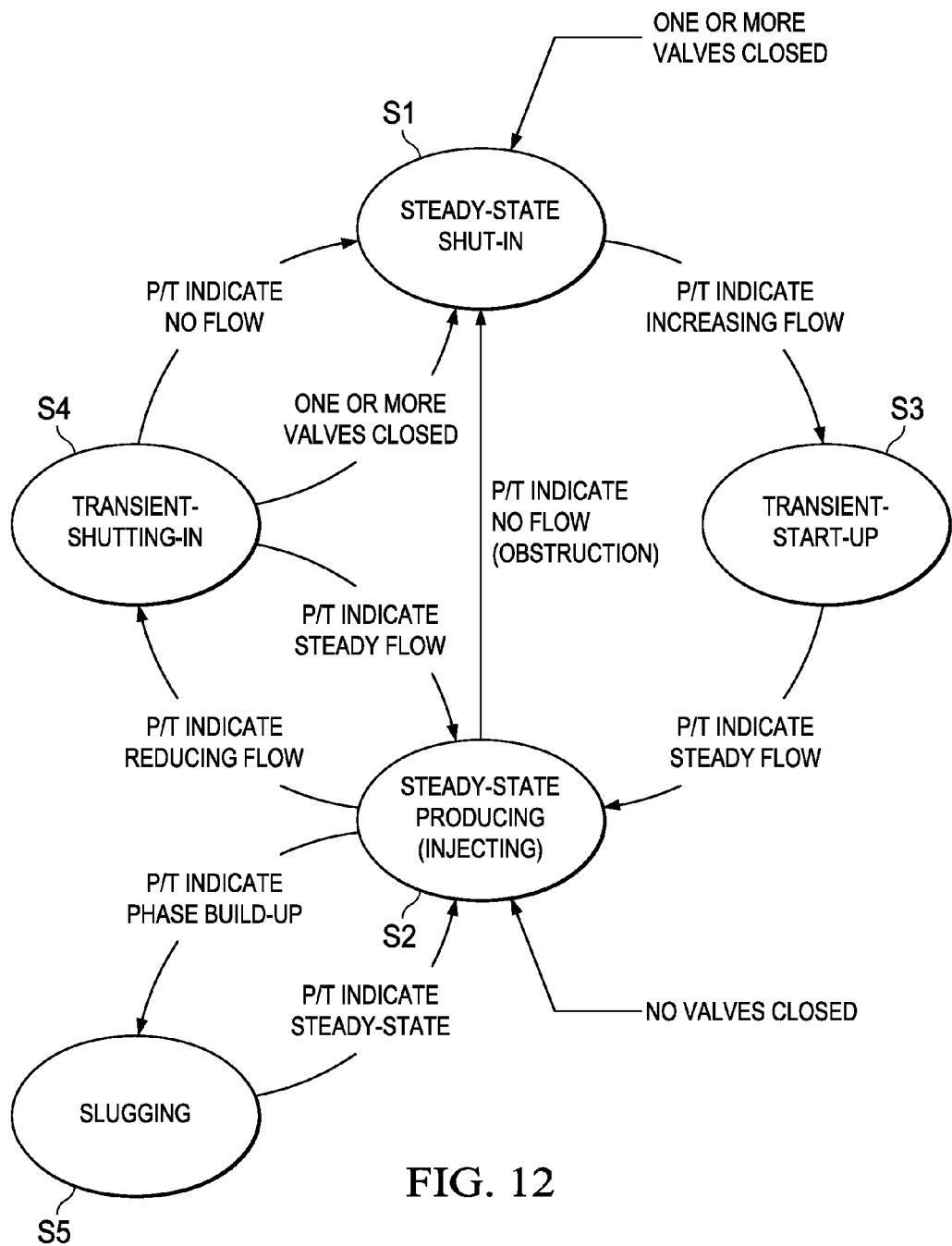
FIG. 12 is a state diagram illustrating the operation of an example of the determination of well operating state in the process of FIG. 8, according to a preferred embodiment of the invention.

In the example of FIG. 12, five potential operating states S1 through S5 for well W are illustrated, along with conditions that can cause a transition from one state to another. Steady-state shut-in state S1 corresponds to a well W through which no flow is passing, while steady-state producing (or injecting) state S2 corresponds to the state in which well W is passing fluid in a relatively steady-state. The steady-state states S1, S2 can be initially detected, in this process 50, based on the position of choke valve 7 or other valves in the production flowline of well W; if any one of those valves is sensed to be in a closed position, steady-state shut-in state S1 is detected, because of the absence of flow necessarily resulting in that condition. Conversely, if choke valve 7 and all other valves in the flowline are open, steady-state producing state S2 can be entered. As evident in FIG. 12, steady-state producing state S2 can also apply to well W being used as an injecting well; the distinction between producing and injecting steady-state conditions is preferably made based on identifying information stored a priori for well W in database 12.

Transient start-up state S3 corresponds to the state of well W as it makes the operational transition from the steady-state shut-in state S1 to steady-state producing state S2. According to this preferred embodiment of the invention, transient start-up state S3 is detected in process 50 based on calculations made according to a predictive well model 27 under the control of model service manager 30 or model service module 32, called by calculation scheduler module 24, based on the applying of the pressure and temperature measurements at well W to one or more predictive well models 27. The manner in which such well models 27 derive rate and phase information will be described in further detail below. Also according to this preferred embodiment of the invention, changes in these temperature and pressure measurements over time can indicate the presence of fluid flow through well W. The detection of increasing flow, by way of changes in these pressure and temperature measurements over recent time, thus causes a transition in the operating state of well W from steady-state shut-in state S1 to transient start-up state S3, and detected in process 50. Similarly, based on the pressure and temperature measurements as applied to predictive well models 27 for well W indicating, over recent time, that a non-zero flow is present but is not substantially changing, a transition from transient start-up state S3 to steady-state producing state S2 occurs, and is detected in process 50.

Conversely, transition from steady-state producing state S2 to transient shutting-in state S4 can be detected, in process 50, by the pressure and temperature measurements for well W indicating, over recent time and by way of one or more predictive well models 27, that the fluid flow through well W is reducing. If these pressure and temperature measurements and well models indicate that there is no flow at all through well W (despite all valves being open), a transition directly from steady-state producing state S2 to steady-state shut-in state S1 can be detected in process 50. This condition can exist if an obstruction becomes lodged somewhere in well W or its production flowline. Finally, the transition from transient shutting-in state S4 to steady-state shut-in state S1 is detected, in process 50, by either the pressure and temperature measurements indicating no flow through well W, or by detection of the closing of at least one valve in the production flowline. Conversely, if the flow stabilizes, albeit at a lower level than previously, as indicated by pressure and temperature measurements monitored over time in process 50, a transition back to steady-state producing state S2 can be detected.

Finally, various error or abnormal flow conditions can also be detected by operation of process 50, in which the operating state or mode of well W is detected according to the preferred embodiment of the invention. As known in the art, the term "slugging" refers to the condition of a well in which one phase builds up rapidly in flow volume; this transient can induce surges in the slugging well itself, and also in neighboring wells in the production field. FIG. 12 illustrates slugging state S5, which can be detected according to this preferred embodiment of the invention, by application of pressure and temperature measurements to one or more predictive well models, by way of which the calculated rate and phase information indicates a build-up of one phase relative to the others; detection of this condition over recent time causes a transition to slugging state S5, which is detected in process 50. Conversely, a transition from slugging state S5 back to steady-state producing state S2 can be detected upon sensing stable rate and phase values over recent time, based on application of temperature and pressure measurements for well W to the predictive well models.

In this manner, the operating state of a given well W is detected in an automated manner, from valve position signals and also measurements of pressure and temperature downhole or at the wellhead or both, at that well W. As discussed above, selection of the particular well models 27 to which the collected measurement data are to be applied may depend on the operating state of well W that is detected in process 50, and also on certain characteristics of well W that have been previously observed or assumed (such characteristics stored in database 12 or otherwise known by calculation scheduler module 24 for well W). As such, the operating state of well W is retained upon completion of process 50, following which control passes to decision 51.

As will be evident from the following description, the computational effort required for calculating rate and phase using multiple models can be substantial. According to this preferred embodiment of the invention, previous results of the rate and phase calculations are "cached" in a memory resource, for example database 12, so that the computational effort of evaluating the models can be avoided if the received data is not substantially different from the previous calculation for that same well W. Calculation scheduler module 24 in server 8a thus executes decision 51 to determine whether the most recent set of measurement data acquired in process 48 has substantially changed from one or more recent calculations of rate and phase. Especially considering that the rate and phase determination according to this invention is intended to approach near-real-time monitoring, decision 51 analyzes the data collected in process 48, including both the recently obtained measurement data from well W and also the most recent current estimates from database 12, to determine whether the value of any parameter in this most recent data has changed, relative to previous values, by more than a threshold amount or percentage. It is contemplated that the particular change threshold for a given measurement can be initially set to a default level, and thereafter modified by a human operator, for example via administration application 28 or model verification application 26. However set, the threshold amount or percentage should correspond to a relatively small change in a parameter value, to ensure that such a small change in the parameter value will not affect the calculated rate and phase results. The comparisons of decision 51 can be performed between the received measurement and the single most recent measurement value, or alternatively the comparisons can be made in a weighted manner relative to a series of recent measurements. As mentioned above, the threshold can be based on a percentage change in the measurement value, or alternatively on an absolute measure of the particular parameter. If no measured (and compared) parameter has changed its value by more than the threshold amount (decision 51 is NO), the previous rate and phase results are stored again in database 12, preferably by way of a new entry $E_{W,t}$ in which the same rate and phase values, and other information, are stored in association with the indicator for well W and a current time-stamp value corresponding to the time at which the rate and phase estimates are to correspond (i.e., a time corresponding to that at which the measurements were taken).

On the other hand, if one or more measured parameters have sufficiently changed in value to exceed the respective threshold amount (decision 51 is YES), then one or more predictive well models 27 are to be evaluated based on the newly received measurement data gathered in process 48. As shown in FIG. 8, this well model calculation is carried out by calculation control algorithm 52, through the use of well models 27. As described above relative to FIGS. 5 and 6, it is contemplated that calculation control algorithm 52 will be executed by calculation scheduler 24, resident in server 8a, calling or instantiating model service manager 30 in online server 8b, which itself applies the data collected in process 48 (and communicated thereto from server 8a) to one or more well models 27, and which also calls or instantiates one or more model service modules 32 to also evaluate well models 27 upon that collected data, as necessary for efficient operation. The results of the evaluation can then be returned back to server 8a from server 8b, according to the example of the architecture illustrated in FIGS. 4 and 5; it is to be understood, of course, that the communication of data and results will vary as necessary and appropriate for the particular system hardware and software architecture used to carry out the monitoring functions of this invention.

In general, as evident from FIG. 8, it is contemplated that the received and collected data from process 48 will be applied to more than one well model 27, each such well model 27 generating rate and phase result output, from which a determination of the most accurate calculation will be performed in process 54. The well models 27 to which these data are applied may be selected based on the operating state of well W detected in process 50, as mentioned above. In any event, according to this multiple-model approach, it is contemplated that model service manager 30 will typically involve one or more instances of model service module 32, and corresponding well models 27, to efficiently carry out the calculation of rate and phase.

Examples of the evaluation of well models 27 with measured data, in process 52, will be instructive. Table 1 discussed above provides a good universe of choke and hydraulic well models 27 that can be used in connection with process 52, according to the preferred embodiment of the invention, although it is of course contemplated that additional or different well models may also be used.

Figure 9:
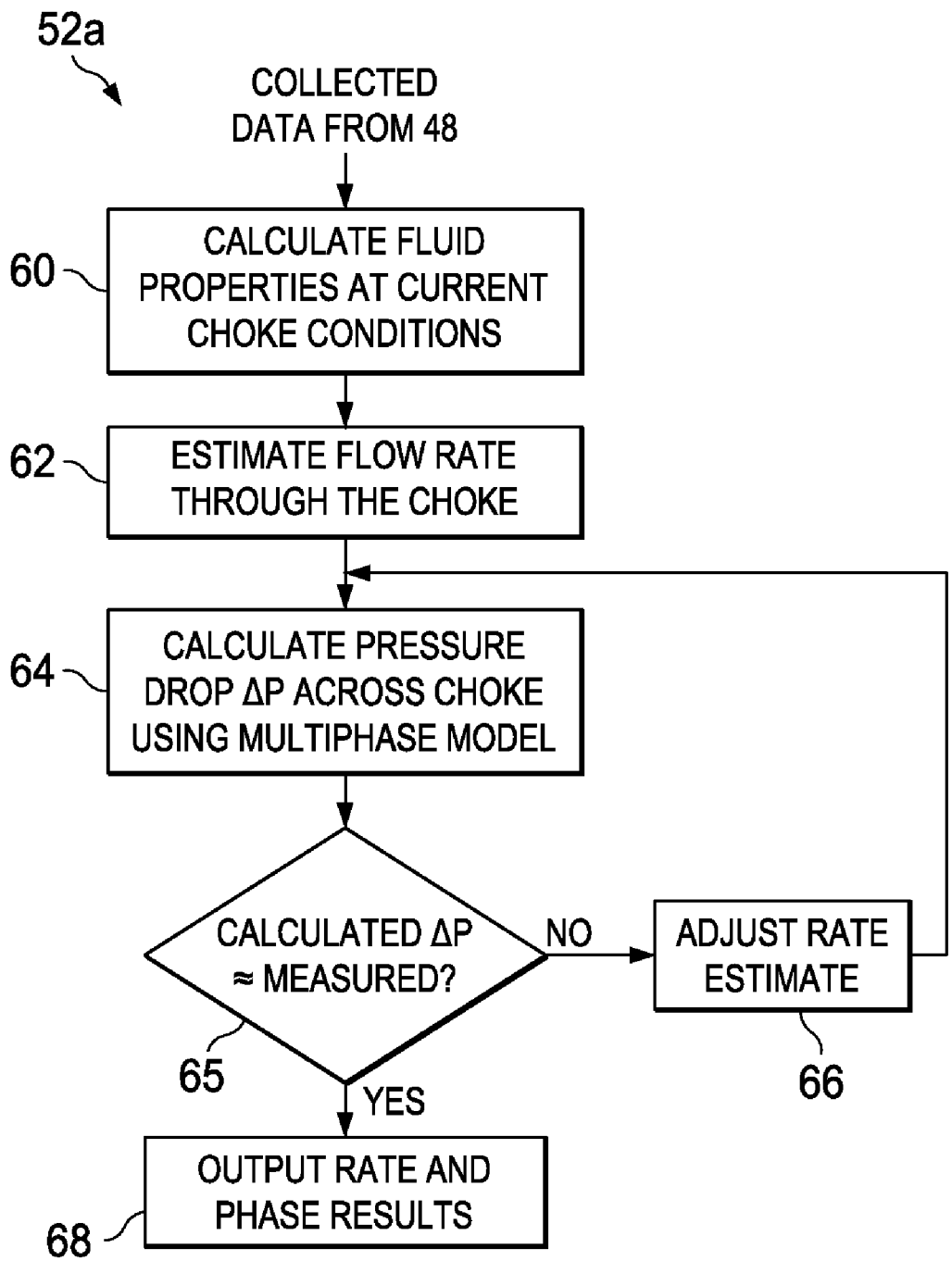
FIG. 9 is a flow diagram illustrating, in further detail, the operation of evaluating a well model in the method of FIG. 5, according to the preferred embodiment of the invention.

FIG. 9 illustrates calculation process 52a, by way of which a conventional Perkins differential pressure choke model is evaluated using data collected in process 48. As mentioned above, calculation process 52a is carried out by one of model service manager 30 or model service module 32, executing a corresponding computer program or routine using well model 27 corresponding to this differential pressure choke model. In process 60, the fluid properties are calculated, based on the measurement data corresponding to pressure upstream of choke valve 7 (e.g., measured by wellhead pressure transducer WPT), pressure downstream of choke valve 7 (e.g., as measured by downstream choke pressure transducer DCPT), and temperature upstream of choke valve 7 (e.g., measured by wellhead temperature transducer WTT). The result of process 60 is an estimate of the phase composition (oil, gas, water) of the fluid flowing through choke valve 7.

An iterative procedure is next carried out, beginning with process 62 in which a first estimate of the flow rate through choke valve 7 is made, based on previous information. Then, in process 64, an estimate of the pressure drop across choke valve 7 is derived, using a conventional multiphase model (such as a Perkins differential pressure choke model for well W) to which the diameter of the choke opening (e.g., calculated from stored geometric parameters for the specific choke valve 7 at well W, in combination with the current choke position measured by choke valve position transducer CPT), and the estimates of phase composition and flow rate are applied. In decision 65, the resulting calculated differential pressure from process 60 is then compared against the measured differential pressure (i.e., the difference between the measured pressures upstream and downstream of choke valve 7 applied to process 60. If these pressure values differ from one another by more than a threshold amount (decision 65 is NO), the current estimate of the flow rate is adjusted in process 66, and a new pressure drop is calculated based on this adjusted flow rate, in process 64, and decision 65 is repeated. Upon the calculated pressure drop from the multiphase model being sufficiently close to the measured pressure drop (decision 65 is YES), model service manager 30 returns the current estimates of flow rate and phase to calculation scheduler module 24 in server 8a, in process 68.

As mentioned above, more than one well model 27 is applied to the collected measurement data in process 52, according to the preferred embodiment of the invention. In this example, in addition to the choke model described above relative to FIG. 9, one or more hydraulics models, such as those described above in connection with Table 1, may be used. For example, application of the collected measurement data to a hydraulic model such as that described above relative to FIG. 3 can be performed by process 52. As described above relative to Table 1, these hydraulics models can include models of inflow and tubing, in which the rate and phase estimates are matched to downhole pressure, or wellhead temperature, or another measurement, based on an estimate of reservoir pressure; these hydraulics models also include tubing-only models, in which the rate and phase estimates are matched against both downhole pressure and wellhead temperature, for example, and from which a reservoir pressure estimate can be derived. And, for these inflow-and-tubing and tubing-only models, variations can be applied to select a particular parameter that is adjusted to match the downhole pressure or wellhead temperature, such parameters including gas-oil ratio (or condensate-gas ratio), watercut, and gaslift (where applicable). Other ad hoc user-defined models and equations can also evaluate the measurement data in process 52.

Figure 10A:
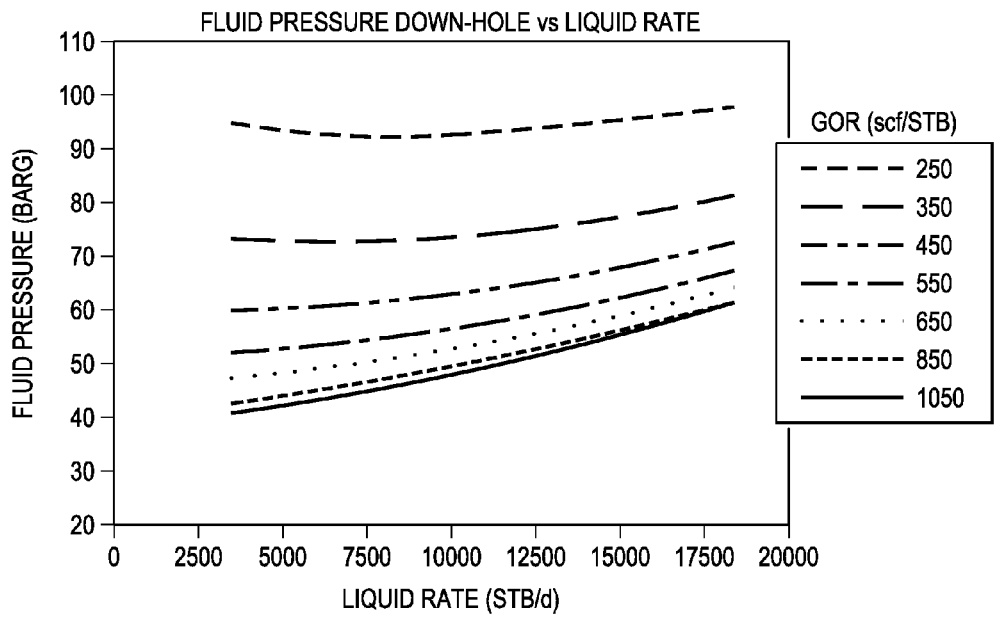
FIGS. 10a and 10b are a graphic representations, illustrative of output from a calibrated predictive model showing downhole fluid pressure as a function of fluid rate for a range of constant gas-oil ratio values, and fluid temperature at the wellhead as a function of fluid rate for a range of gas-oil ratio values, respectively.
Figure 10B:
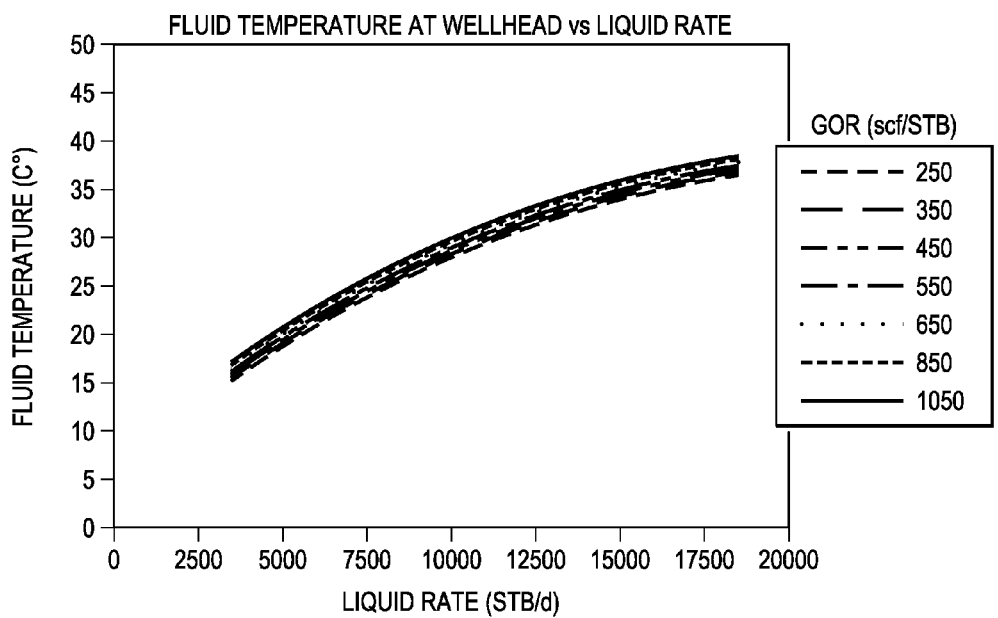

Another example of the application of well model 27 is illustrated graphically in FIGS. 10*a* and 10*b*. In this example, reliable measurements of downhole pressure, wellhead pressure, and wellhead temperature have been obtained for a producing oil well W, for which water cut is assumed to be known and unchanging. According to one of the well models 27, the production rate and the gas-oil ratio, GOR, of the produced fluid can be obtained. FIGS. 10*a* and 10*b* are graphic representations illustrative of output from a calibrated predictive hydraulic well model 27 suitable for this well W using these measurements, such a model corresponding to an inflow-and-tubing model, adjusted for GOR, and matched to wellhead temperature. FIG. 10*a* shows downhole fluid pressure as a function of fluid rate for a range of constant GOR values, according to this well model 27, while FIG. 10*b* shows the resulting predicted fluid temperature at the wellhead as a function of the same fluid rate and GOR values, also according to this predictive well model 27. As shown in FIGS. 10*a* and 10*b*, this predictive well model illustrates that, for constant GOR, the wellhead temperature normally rises significantly with increasing production rate while the downhole gauge pressure will also rise for rates high enough for stable flow, and that, for a constant production rate, the downhole pressure will fall with increasing GOR while the wellhead temperature changes only very little.

In this preferred embodiment of the invention, numerical techniques are applied to determine the combination of production rate and GOR that correspond to the measured downhole gauge pressure and wellhead temperature. For instance, a measurement of downhole pressure at 50 barg in combination with a measurement of wellhead temperature at 25° C. will yield rate and phase values of 7500 STB/d and 650 scf/STB, respectively.

In the examples discussed above, the absolute measurement values obtained from the various sensors and transducers are applied to predictive well models 27 to derive rate and phase values. Alternatively, predictive well models 27 could also be included that calculate changes in production rate and phase from detected changes in sensor readings, rather than the absolute measurement values. One advantage to such change calculations is that readings from sensors which are no longer calibrated correctly can still be used in these change calculation well models 27. As mentioned above, "dead-banding" of measurements is not necessary in connection with the preferred embodiments of this invention; according to this alternative approach of carrying out change calculations, such dead-banding would in fact mask changes in sensor readings, and thus would be detrimental if applied in these differential models.

Once all appropriate estimates of rate and phase values are determined by calculation control algorithm 52, from multiple well models 27 as described above, the monitoring process according to the preferred embodiment of the invention selects or derives a final rate and phase result from those estimates, in process 54. According to the preferred embodiment of this invention, well models 27 are assigned a hierarchy based on the particular conditions for which a given model is most appropriate. For example, a first well model using readings from four sensors may be used to calculate rate and phase, but a different well model may be preferable if only three of those four sensors are functioning properly. As a further example, a particular well model may be used in a near steady-state scenario, while the system employs a different well model under different performance criteria. In some cases, operator inputs, or inputs triggered by operator decisions, may alter the particular well model that is used. For example, a particular well model may be used if all chokes and valves are fully open, and a different well model may be used when certain valves are closed or partly closed. Beyond selection of a particular well model to use its rate and phase estimates, rate and phase estimates from different well models may alternatively be combined to provide a composite estimate of rate and phase for an increment of time, based on the state of wells W or surface facilities.

Many variations in the selection or hierarchy of well models are available. For example, certain simple approximations from user-defined equations may be used in place of any of the well models if data is unavailable. For example, while a predictive well model that calculates rate and phase information from at least three sensor inputs may be preferred in general, a less preferred model in which the measurement from a sensor is approximated or assumed may serve as a backup if only two sensor readings are available. Alternatively, a particular well model may be selected if a reading from a specific sensor changes by more than a predetermined amount in comparison to changes in other sensor readings. The effects of a less accurate result through use of these approximations or less preferred models are reduced because of the frequency with which rate and phase estimates are made according to the preferred embodiments of this invention. As such, the use of multiple models renders the monitoring of a well or wells more tolerant of condition changes, sensor failures, or anomalous data.

Figure 11:
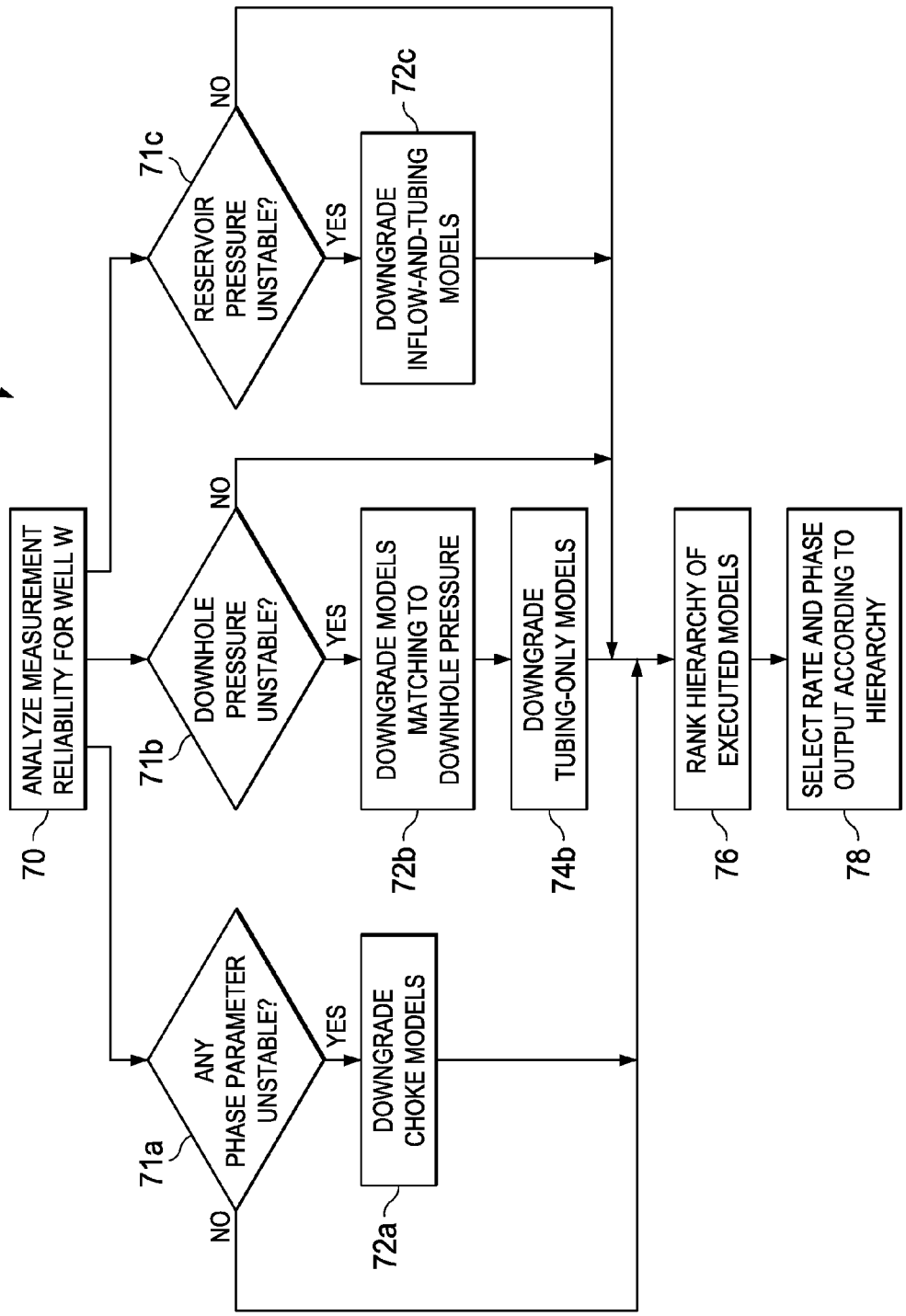
FIG. 11 is a flow diagram illustrating the operation of one possible selection procedure based on arranging a hierarchy of multiple well models evaluated according to the method of FIG. 8, according to the preferred embodiment of the invention.

Referring now to FIG. 11, the operation of process 54, in which the results from these well models 27 are analyzed and final estimates of rate and phase are selected or derived, will now be described in further detail. In process 70, calculation scheduler module 24 executes a software routine to analyze the reliability of measurement data as collected in process 48 discussed above. It is contemplated that analysis process 70 can be carried out according to a wide range of techniques. For example, each measurement value can be compared with a range of expected values, in order to screen out measurements that have obviously invalid data, such as may result from a transducer or other sensor failing or inoperable. In addition, or alternatively, each measurement value can be statistically compared against its previous measurements over time, to determine whether the current measurement is stable or varying over time. In a more sophisticated approach, a comparison of the current measurement for a given transducer relative to what other transducers associated with well W are measuring, using a simplified model or the like, can indicate whether that measurement is realistic for the conditions.

It is contemplated that those skilled in the art having reference to this specification can readily apply these and other analysis techniques to determine the reliability of each of the applied measurements, in this process 70 according to the preferred embodiment of the invention.

Upon completing analysis process 70, calculation scheduler module 24 carries out decisions 71a through 71c by way of which a hierarchy of the well models 27 is derived. In this example, decision 71a determines whether any phase parameter (e.g., gas-oil ratio, watercut, gaslift rate) is varying (and thus not stable) or anomalous. If so (decision 71a is YES), the choke models evaluated in process 52 are downgraded from the standpoint of hierarchy in process 72a, because it is well known that choke models are premised on stable values for these phase parameters. By downgrading, according to this embodiment of the invention, it is contemplated that the downgraded well models 27 are either disqualified from being used, or have a weighting or other factor adjusted to indicate that their results are likely to be in accurate. Similarly, decision 71b determines whether the downhole pressure measurements are unstable, following the analysis of process 70. If so (decision 71b is YES), then those well models 27 that match the rate and phase estimates to downhole pressure measurements are downgraded in process 72b, and in process 74b, the tubing-only well models 27 are downgraded (as those models match rate and phase to measurements of both wellhead temperature and downhole pressure). And decision 71c determines whether the current estimate of reservoir pressure are unavailable or exhibits time-variation; if so (decision 71c is YES), the inflow-and-tubing hydraulic well models 27 are downgraded in process 72c, considering that models of that class assume a stable reservoir pressure.

Upon such downgrading of models as performed by processes 72a, 72b, 74b, 72c, or if such downgrading is unnecessary (one or more of decisions 71a, 71b, 71c returning NO results), calculation scheduler module 24 ranks the executed well models 27 according to these results in process 76, in a manner consistent with the results of this analysis. This ranking can take into account a predetermined hierarchy established for well W. For example, a human operator may have previously established an order in which well model 27 results are to be ranked for this well W; the downgrading of well models 27 performed by processes 72, 74 in this manner may alter that pre-selected order. Alternatively, the analysis and downgrading of process 54 may be used to establish the initial order, taking into account general preferences or other rules (e.g., well models 27 that match rate and phase to wellhead temperature are less preferred than those matching rate and phase to downhole pressure, as discussed above). In any case, process 76 produces a hierarchy or selection of well models 27, based on their perceived accuracy.

Examples of the analysis and downgrading operations in this process 54 will be instructive. For example, a well with non-zero gaslift rate, but for which the gaslift rate measurement has failed or is dubious and which also has a changing reservoir pressure, could produce a hierarchy of well models 27 of: 1) Tubing-only hydraulic model (matched to downhole pressure and wellhead temperature), adjusting gaslift; 2) inflow-and-tubing hydraulic model, matched to downhole pressure, adjusting gaslift; and 3) inflow-and-tubing hydraulic model, matched to wellhead temperature, adjusting gaslift. The hydraulic models ranked 2) and 3) in this case are downgraded from the top-ranked model, because of the variability of reservoir pressure; however, these second- and third-ranked models may be useful as backups. The other hydraulic models and the choke models (see Table 1) are downgraded below these three, because those models assume stable gaslift rate if gaslift is present at the well, as it is in this case. For example, the Perkins Choke model will use an incorrect gas-to-liquids ratio in this situation, and will thus infer an incorrect oil rate from the measured pressure drop across the choke.

In another example, a well for which the gaslift rate is measured accurately, but that exhibits varying watercut values due to coning from the aquifer or breakthrough from an injector, produces a different hierarchy of well models 27 by application of process 54. If the reservoir pressure is known accurately, the full inflow-and-tubing hydraulic models of Table 1 are available, in addition to the tubing-only models. An example of a possible hierarchy in this situation can be: 1) inflow-and-tubing hydraulic model, matched to downhole pressure, adjusting watercut; 2) tubing-only hydraulic model (matched to both downhole pressure and wellhead temperature), adjusting watercut; and 3) inflow-and-tubing hydraulic model, matched to wellhead temperature, adjusting watercut. Other models would be ranked below these, as their accuracy would be suspect under these conditions.

Yet another example can be considered, in which there is no wellhead temperature transducer WTT and in which the downhole pressure transducer PT for well W has failed and in which GOR is changing. In this situation, an appropriate hierarchy would be: 1) inflow-and-tubing hydraulic model, matched to wellhead temperature, adjusting GOR; and 2) Perkins choke model. In this case, the tubing-only models cannot be used, as they require a downhole gauge pressure measurement. The Perkins choke method is included to provide a backup to the selected hydraulics model. Other models are not contemplated to produce accurate results in this situation.

Following the ranking of the hierarchy of well models in process 76, calculation scheduler 24 executes process 78 to derive rate and phase estimates based on the output from well models 27, according to that hierarchy. Process 78 may be executed in various ways. For example, process 78 may simply select the output from well model 27 that is highest in the hierarchy, as suggested above. Or the rate and phase output from this most highly-ranked well model 27 may be selected only if it produces values that are reasonably close to the next-most high ranked model or models. Alternatively, process 78 may compute an average of the highest-ranked well model 27 output values; if desired, a weighted average of rate and phase may be derived, in which the higher-ranked well models 27 are more highly weighted in that average. In any case, the rate and phase values produced by process 78 constitute the output of process 54.

As discussed above, processes 52 and 54 effectively calculate rate and phase values by applying the collected measurement data to all valid well models 27 (valid well models being those models for which all necessary data are available), with the hierarchy determination of process 54 determining which results to use. Alternatively, process 54 may be performed in whole or in part prior to calculation process 52, to determine the hierarchy of well models 27. to which the measurement data are applied, so that computational capacity can be conserved by not evaluating those well models 27 that are less likely to produce accurate rate and phase information. Further in the alternative, some combination of these two approaches may be followed, with a subset of well models 27 selected prior to calculation process 52, and the calculated results from process 52 then ordered according to a hierarchy in the manner described above.

As known in the art, transducers and sensors at wells W can experience short term or extended failure, and can experience drift in calibration or even sudden changes. Also, sensor data may occasionally fail to transmit or may not be transmitted properly. In other cases, some sensors may not transmit data as reliably as other sensors. These faults are especially likely for downhole sensors, such as downhole pressure transducers PT. It is contemplated that rate and phase values computed in accordance with this invention are more tolerant of such sensor errors than other systems, considering the hierarchy of well models 27 determined in process 54, and the ability of these models to receive and process over-specified input data. More specifically, some of the predictive well models 27 employ more than the minimum data required for rate and phase determination; conversely, measurement data may be available for parameters that one or more of well models 27 otherwise assume or can calculate. This over-specification of input data to the well models 27 leads to the advantageous use of such additional data to compensate for sensor inaccuracy. FIG. 8 illustrates optional process 57, by way of which calculation scheduler module 24 is capable of calibrating or adjusting its output based on the output from one or more well models 27.

For example, if a wellhead temperature transducer WTT is providing an inaccurate temperature measurement in an absolute sense, but operating in a sufficiently precise manner that its measurements could be used for rate and phase calculations, the absolute values of its readings will be inconsistent with other data. In accordance with this invention, as described above, data from that particular sensor would not be used in the final rate and phase determination, for example by downgrading its associated well models 27 in the hierarchy determined in process 54. However, in process 57, process module 24 may use the determined rate and phase output from the selected well models 27, in addition to other current measurement data, to calculate what that particular sensor reading value should have been. Process 57 may also use sensor readings and model calculations over time to determine whether the measurement data from the particular suspect sensor can be adjusted by a factor or function to provide the correct output value. In any event, according to this preferred embodiment of the invention, a calibration factor or function can be derived, in optional process 57, by way of which future measurement data from that suspect sensor (e.g., the wellhead temperature transducer WTT) is adjusted, and the adjusted temperature values used in future calculations of rate and phase. It is contemplated that the high frequency with which the rate and phase calculations are contemplated to be performed, calibration process 57 can be accomplished in a relatively short time, for example in a few minutes or less.

Alternatively, process 57 may be arranged so that well models 27 in the hierarchy calculate the expected values of each sensor assuming the other sensors within the system are correct. These expected values can then be compared against the actual received measurement from individual sensors. For any sensor in which the received measurement is substantially different from its expected value, for example by more than a threshold amount or percentage, that sensor may be flagged as having drifted out of calibration or adjustment, and thus requiring a calibration factor as discussed above. Of course, if the differential is sufficiently large, an indication that this sensor is failed can be stored in database 12 or elsewhere, for use in future monitoring. In this approach, the direct comparison of predicted and measured values for most sensors used in the system, in a near real time and continuous basis, can be used to alert the human operator to instances sensor drift or failure, thus increasing the quality control and assurance on the values generated.

Referring back to FIG. 8, the rate and phase values from process 54 are forwarded, by calculation scheduler module 24 (FIG. 5), to data historian modules 20. In process 56, data historian modules 20 manage the storing of these new rate and phase values, as well as the well operating state determined in process 50 if desired, in database 12. As before, storing process 56 preferably creates a new entry $E_{W,t}$ in which the newly calculated rate and phase values, and any such other information resulting from calculation process 35 or otherwise, are stored in association with the indicator for well W and a current time-stamp value to be associated with these rate and phase values from this calculation, to maintain the time base for the estimates. In addition, to the extent that these rate and phase values, or other calculations such as reservoir pressure and the like, are used in functions that are evaluated for the next determination of rate and phase for well W, those functions may optionally be updated at this point, using the newly estimated rate and phase values.

Referring back to FIG. 7, the storing of the time-associated rate and phase values in process 56 completes this instance of calculation process 35. Meanwhile, calculation process 35 is carried out for such other wells W from which current measurement data has been produced, as suggested by the multi-asset software architecture described above in connection with FIG. 6. And following the completion of this instance of calculation process 35, it is contemplated that this near-real-time and continuous monitoring process will then begin its next instance, according to the frequency or periodicity previously selected by the human user or engineer. And as mentioned above, a next instance of the monitoring process for well 35 may be initiated "on demand" from a user, prior to the normal time at which the next instance would commence in its periodic operation.

According to the preferred embodiment of this invention, the result of the rate and phase calculations produced by process 35 are managed and used in various ways. As illustrated in FIG. 7, validation process 36 receives data from production facilities, for example, export facilities, flowlines, separators or any other production related facility, and validates the calculations from calculation process 35 against those facilities data. Validation process 36 may be performed for each rate and phase calculation for each well, or may be performed only periodically; in addition, validation process 36 may be performed "on-demand", for example in response to a user or administrator request (FIG. 5), or if a particular "event" is detected as will be described below. In general, the rate and phase calculations from process 35 are validated, in process 36, by evaluating the consistency of those calculations and results against the facilities data. In addition, as shown in FIG. 7, data from tests conducted on wells within the field can be used to calibrate the models via calibration process 34. For example, production from one or more wells may periodically be routed through test separators to ensure proper calibration of the models used for rate and phase determination. Those wells which have more recently undergone such test separator calibration may be deemed to be more reliable and, therefore may be adjusted to a lesser degree than other wells. This combination of calibration process 34 and validation process 36 reduces errors, and thus provides more reliable and accurate results.

The calculated rate and phase values from calculation process 35, according to the preferred embodiments of this invention, may then be adjusted using one or more reconciliation factors or equations, in reconciliation process 40. This process 40 uses the production rate and phase determined for multiple wells W that share export facilities, determined according to the preferred embodiments described above, and reconciles those rate and phase calculations against data and measurements from those export facilities. In such reconciliation, periodic export data is compared to the sum total production for the same period from each well feeding into the export facility. Any difference between the totals can be used to create a reconciliation factor, which may be in the form of a function or, if sufficiently stable, a constant. In those cases where the export facilities data is more reliable than the well data, the reconciliation factor is applied to each well W sharing that export facility. For example, the production information from each such well W may be adjusted pro-rata to reconcile the totals. Alternatively, if data from one or more wells $W_k$ is considered less reliable than other wells W sharing that export facility, production data from those less reliable wells $W_k$ may be reconciled to a greater degree than data from the more reliable wells W. This methodology applies equally to oil water and gas from production wells and to injection water or injection gas distributed to well via common compression systems.

In other cases, the rate and phase calculations from wells W may be considered more reliable than data from export facilities. In such other cases, the export facility data may be reconciled using the well data and the export facility data may be adjusted.

Reconciliation process 40 thus also allows better determination of anomalous results from individual wells. For example, reconciliation process 40 may reveal a sudden increase in the discrepancy between well data and export facility data. Further investigation may reveal that a particular well experienced changed conditions during that time period or that a particular well experienced an unexpected deviation in calculated rate and phase values. In either case, reconciliation process 40 can help identify such issues that requiring further attention. Conversely, this reconciliation may also reveal faults in export facilities equipment.

With further reference to FIG. 7, the reconciled data produced by reconciliation process 40 can then be used in additional ways. For example, the reconciled rate and phase values from process 40 can be used to determine whether any alerts or actions should be triggered, in alert process 38. Typically, the reconciled results are analyzed by process 38 in relation to predetermined parameters. For example, if the reconciled results are outside a predetermined range, an alert or other action may be triggered. Such analysis may involve a series of reconciled results which may be analyzed to identify a pattern or trend and may trigger an alert. Because continuous and near real time data is used, the information can be analyzed in alert process 38 for correlations which may be used to set future alert parameters. For example, when an event occurs, the data can be reviewed by a human operator, via web browser application 25 (FIG. 5) for example, to determine whether a particular trend or pattern can be identified which may correlate to the particular event. If identified, the pattern or trend can be used to set new or updated alert parameters for the particular event, for future instances of alert process 38.

For example, wells typically experience periodic shut-ins—either planned or unplanned. These shut-in events are useful, in that reservoir pressure determined during a shut-in can be input into a predictive well model 27, and current sensor measurement data then applied to that model to determine the average reservoir pressure and skin for that well W. Positive skin is a measure of the additional pressure experienced near well bore over and above that required to flow the fluids through rock of a known permeability (skin increases progressively as rock near a well becomes damaged due to scale or solids deposition) while negative skin is the reduction in the expected pressure drop needed to flow the fluids through the rock at the near well bore which may occur, for example, due to artificial stimulation and fracturing of the rock or the natural onset of sand production with flow. Frequent skin value determinations allow operators to better anticipate changes in reservoir performance and more effectively take corrective action if problems are observed. This calculation of reservoir pressure and skin factor for a newly shut-in well W can be carried out by a human operator in response to an alert issued by alert process 38.

As illustrated in FIG. 7, these data may be applied to hydrocarbon allocation process 44 to apportion the actual produced fluid volumes between the wells and the reservoir zones from which they produce, for regulatory reporting and financial accounting purposes. In addition, these reconciled data may be applied to reservoir simulation process 42, to produce or update a simulation or a model for the entire reservoir. For these and other purposes, the calculated rate and phase data may be averaged over a period of time, or alternatively may be applied in "raw" form, without averaging, filtering, or other mathematical manipulations.

A reality in modern production fields is that activity in a particular well may impact other wells. For example, a production increase in one well may decrease or otherwise impact production in other wells. In another example, water injection designed to improve production of a well may also have an impact on other wells in the field. According to conventional techniques, this inter-relation among wells is not fully appreciated or utilized in reservoir maintenance, because of the lack of real-time continuous data.

According to this preferred embodiment of the invention, as illustrated in FIG. 7, predictive well models 27 are applied, in instances of calculation process 35, to measurements from multiple wells W in the same production field. The results of these multiple instances of calculation process 35 are correlated with one another, in process 45. This correlation process 45 may be performed by calculation scheduler module 24 either on a periodic basis, or on demand based on a request from a human operator via remote access terminal RA. Correlation process 45 is contemplated to include conventional statistical correlation of rate, phase, and other parameters over multiple wells W, using the associated time-base or time-stamps on those results to align the results among the various wells. For example, correlation of the rate and phase results from multiple wells in a field in process 45 may allow the human operator to identify a correlation between a particular activity in one well and a corresponding impact on another well. Such correlation is not readily available in conventional systems using empirical models, or using less frequent calculations. On the other hand, by employing the methods in accordance with this invention, operators are better able to optimize production and improve reservoir management.

In other cases, use of predictive models in accordance with this invention on multiple wells W in a field or reservoir can help identify anomalous well performance. For example, in the event that rate and phase determination reveals a change in production from a particular well in a certain field, the operator may expect to observe certain changes in performance of other wells. If correlation process 45 indicates that those expected changes in the performance of other wells did not occur, or occurred to a substantially lesser extent than expected, the human operate could then carry out closer investigation, to determine whether the unexpected change (or lack of change) is due to a fault in the sensors or other equipment at one of the wells, or an unexpected characteristic of the reservoir formation. The frequent calculations resulting from the preferred embodiments of this invention permit a better understanding of inter-relation of well performance, and thus enable operators to more readily adjust the operation of each well to obtain optimum overall performance.

The predictive models and other equations in accordance with this invention are preferably employed in computing facilities located remotely from the well and may even be remote from the field. For example, sensor data may be transmitted to a regional or central location when rate and phase calculations are performed. Each rate and phase value calculated is preferably stored and made available for display in both numerical and graphical format by users. Such users may in turn be located in locations remote from the regional or central location. For example, such users may be operators on a platform or may be engineering personnel in other locations.

The method, system, and computer software according to the preferred embodiments of the invention provide important advantages and benefits in the operation of a hydrocarbon production field. Because data and information are continuously provided in near-real-time, according to the preferred embodiments of the invention, correlations and trends in the production from individual wells, and over the entire production field and reservoir, can be more easily observed, and more timely observed. In addition, because of the automated nature of the monitoring system according to the preferred embodiments of the invention, the human operator can receive alerts of changes in conditions, or upon certain occurrences in the field. This allows operators to take corrective or other action with better response time than systems which do not provide real time continuous information. In addition, the human operators are not burdened with sifting through the massive amount of measurement data generated from modern transducers, operating at data acquisition frequencies of has high as one per second per transducer. The near-real-time calculations provided by this system are particularly useful in detecting and being alerted to the onset of well flow instability, slugging, and the like, and to the effect that such conditions have on wells flowing into common flowlines.

In addition, as described above, according to the preferred embodiments of the invention, current measurements from a well can be applied to more than one well model, with a hierarchy of models derived according to a measure of the reliability of the measurements from various sensors, the accuracy of the monitoring system is greatly improved over conventional single-model snapshot methods. The monitoring system according to this invention is also able to manage these multiple well models, on near-real-time measurement data, in an automated manner, thus freeing human operation staff from dealing with a high volume of data in order to manage the production field. In short, the methods and system according to the preferred embodiments of the invention provide more accurate results, in a more timely manner, with less human intervention required, as compared with conventional monitoring approaches in the industry, and more robustly from the standpoint of sensor and transducer accuracy, calibration, and reliability.

In addition, the results from well models that are not deemed to provide the most reliable rate and phase measurements can still be useful in identify trends or patterns that may correlate to events. Such a pattern or trend may even be identified using results from more than one model to identify a correlation of an event with the combination of results.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of determining rate and phase of fluid produced from or injected into a hydrocarbon well, the method comprising the steps of:
    for a plurality of wells in a production field, performing a plurality of steps comprising:
        obtaining temperature and pressure measurements, from sensors at the well, one or more of the measurements corresponding to a first point in time;
        evaluating a function to calculate a value for a model parameter, the value corresponding to the first point in time;
        operating a computer to apply the temperature and pressure measurements and the calculated model parameter value to at least one predictive well model, to calculate fluid rate and phase composition values from those measurements;
        storing the fluid rate and phase composition values and an associated time indicator corresponding to the first point in time, in a memory;
        repeating the obtaining step for at least one of the temperature and pressure measurements corresponding to a second point in time; and
        then repeating the evaluating and operating step to calculate fluid rate and phase composition values corresponding to the second point in time;
    and the method further comprising:
        obtaining export data corresponding to a sum total of production from the plurality of wells over a period of time;
        reconciling the stored calculated fluid rate and phase composition values for the plurality of wells over the period of time with the export data by adjusting one of the export data or the stored calculated fluid rate and phase composition values by a reconciliation factor corresponding to a difference between the stored calculated fluid rate and phase composition values for the plurality of wells over the period of time with the export data.

2. A computer system, comprising:
    a data interface for receiving measurement data corresponding to temperature and pressure measurements from at least one hydrocarbon well;
    a memory resource for storing a database;
    one or more central processing units for executing program instructions; and
    program memory, coupled to the central processing unit, for storing a computer program including program instructions that, when executed by the one or more central processing units, cause the computer system to periodically perform a sequence of operations for determining rate and phase of fluid produced from or injected into a hydrocarbon well, the sequence of operations comprising, for each of a plurality of wells in a production field:

receiving data from the data interface corresponding to temperature and pressure measurements from sensors at a well, the measurements associated with a point in time;

evaluating a function to calculate a value for a model parameter, the value corresponding to the associated point in time;

applying the temperature and pressure measurements and the calculated model parameter value to at least one predictive well model, to calculate fluid rate and phase composition values from those measurements; and storing, in the database, the fluid rate and phase composition values and a time indicator corresponding to the associated point in time;

and wherein the sequence of operations further comprises:

obtaining export data corresponding to a sum total of production from the plurality of wells over a period of time;

reconciling the stored calculated fluid rate and phase composition values for the plurality of wells over the period of time with the export data by adjusting one of the export data or the stored calculated fluid rate and phase composition values by a reconciliation factor corresponding to a difference between the stored calculated fluid rate and phase composition values for the plurality of wells over the period of time with the export data.

3. A non-transitory computer-readable medium containing computer instructions stored therein that, when executed on a computer system, cause the computer system to periodically perform a sequence of operations for determining rate and phase of fluid produced from or injected into a hydrocarbon well, the sequence comprising, for each of a plurality of wells in a production field:

receiving data corresponding to temperature and pressure measurements from sensors at the well, the measurements associated with a point in time;

evaluating a function to calculate a value for a model parameter, the value corresponding to the associated point in time;

applying the temperature and pressure measurements and the calculated model parameter value to at least one predictive well model, to calculate fluid rate and phase composition values from those measurements; and storing, in the database, the fluid rate and phase composition values and a time indicator corresponding to the associated point in time;

wherein the sequence of operations further comprises:

obtaining export data corresponding to a sum total of production from the plurality of wells over a period of time;

reconciling the stored calculated fluid rate and phase composition values for the plurality of wells over the period of time with the export data by adjusting one of the export data or the stored calculated fluid rate and phase composition values by a reconciliation factor corresponding to a difference between the stored calculated fluid rate and phase composition values for the plurality of wells over the period of time with the export data.

* * * * *